United States Patent [19]
Diament

[11] Patent Number: 5,905,498
[45] Date of Patent: *May 18, 1999

[54] SYSTEM AND METHOD FOR MANAGING SEMANTIC NETWORK DISPLAY

[75] Inventor: Theodore M. Diament, New Rochelle, N.Y.

[73] Assignee: Correlate Technologies Ltd, Ramat Gau, Israel

[*] Notice: This patent issued on a continued prosecution application filed under 37 CFR 1.53(d), and is subject to the twenty year patent term provisions of 35 U.S.C. 154(a)(2).

[21] Appl. No.: 08/772,801

[22] Filed: Dec. 24, 1996

[51] Int. Cl.$^6$ ............................... G06F 3/14; G06F 17/30
[52] U.S. Cl. .................... 345/356; 345/348; 345/334; 345/335; 707/102
[58] Field of Search ..................... 345/356, 334, 345/335, 333, 353, 346, 348, 968, 440; 707/102, 103, 104, 101

[56] References Cited

U.S. PATENT DOCUMENTS

| | | | |
|---|---|---|---|
| 4,953,080 | 8/1990 | Dysart et al. ........................ | 707/103 |
| 5,088,052 | 2/1992 | Spielman et al. .................... | 345/346 |
| 5,193,182 | 3/1993 | Bachman et al. .................... | 707/100 |
| 5,206,951 | 4/1993 | Khoyi et al. ......................... | 395/683 |
| 5,392,390 | 2/1995 | Crozier ................................. | 345/335 |
| 5,410,693 | 4/1995 | Yu et al. .............................. | 707/100 |
| 5,412,758 | 5/1995 | Srikanth et al. ..................... | 706/59 |
| 5,428,776 | 6/1995 | Rothfield ......................... | 345/348 X |
| 5,448,693 | 9/1995 | Blades et al. ........................ | 345/348 |
| 5,452,468 | 9/1995 | Peterson ............................... | 345/419 |
| 5,491,795 | 2/1996 | Beaudet et al. ..................... | 345/346 |
| 5,542,024 | 7/1996 | Balint et al. ........................ | 345/356 |
| 5,546,519 | 8/1996 | Berry .............................. | 345/348 X |
| 5,548,749 | 8/1996 | Kroenke et al. .................... | 707/102 |
| 5,550,971 | 8/1996 | Brunner et al. ................. | 345/356 X |
| 5,561,753 | 10/1996 | Coulombe et al. ................. | 345/326 |
| 5,606,654 | 2/1997 | Schuur ................................ | 345/440 |
| 5,630,125 | 5/1997 | Zellweger ........................... | 707/103 |
| 5,701,137 | 12/1997 | Kiernan et al. .................... | 345/340 |
| 5,845,277 | 12/1998 | Pfeil et al. ..................... | 707/104 X |

OTHER PUBLICATIONS

International Search Report (PCT/ISA/210) for International Application No.: PCT/IL97/00419, date of report Apr. 27, 1998.

*Primary Examiner*—Raymond J. Bayerl
*Attorney, Agent, or Firm*—Weil, Gotshal & Manges LLP

[57] ABSTRACT

Computer software and a user interface for information management are provided in which semantic networks may be entered and analyzed. The user interface for entry of the semantic network uses a windows environment to enter the nodes and the arcs connecting the nodes. Arcs may serve as sources or destinations for other arcs. The software includes a first data structure relating to the structure of the semantic network and a second data structure relating to the display of the semantic network. Additional data structures may be used to show the semantic network in group, table, and other forms. Two illustrative applications are described for Internet Management and Resource Management.

10 Claims, 39 Drawing Sheets

| | picture | | married | email | friend | home page |
|---|---|---|---|---|---|---|
| Fred | 🖼 | 212-9214823 | Wilma | Fred@RockNet.com | Barney | bedrock.com/fred |
| Betty | 🖼 | 212-9213849 | Barney | | Wilma | |
| Wilma | 🖼 | 212-9214823 | Fred | | Betty | |

320

Bedrock — citizen

| Attorney | Department | Client |
|---|---|---|
| Flintstone, Fred | Labor | Delta Airlines<br>Jonestown Trucking |
| Rubble, Barney | Labor | Sears<br>Philip Morris |
| Rock, Susan | Litigation | Reebok |

⊟ Flintstone & Rubble
☐ attorney

| Company | Home Page | FAQ | Corporate Info | Jobs |
|---|---|---|---|---|
| Microsoft | www.microsoft.com | faq.htm | info.html | newjobs.html |
| IBM | www.ibm.net | ibm_faq.html | corpinfo.html | ibm_jobs.html |
| Motorola | www.mot.com | faqindex.html | corp.html | jobindex.html |
| Intel | www.intel.com | about.html | corporat.html | openings.html |

Favorite Links — Company

SYSTEM AND METHOD FOR MANAGING SEMANTIC NETWORK DISPLAY

FIELD OF THE INVENTION

This invention relates to computer software and user interfaces for information management. An apparatus and method are disclosed for entering and managing information on a computer system using a natural user interface.

BACKGROUND OF THE INVENTION

Computer software exists for many applications. Suites of office applications, by Microsoft, Lotus, Corel and others, are available for use with computers and are often bundled with the sale of a computer. Such office suites generally include software for word processing, graphic, spreadsheet and database applications. In Microsoft Office, these computer programs include Word, PowerPoint, Excel and Access.

In general, an office suite includes two types of computer programs. A first type of software includes word processing and graphic programs, which allow a user to enter information and present it in a visually pleasing manner. Typically, such programs allow a user to present information in a variety of forms without extensive training or specialized knowledge of the software program. These programs, though, are limited to providing data formatting functions and do not permit analysis of the data entered. A second type of software includes spreadsheet and database programs, which allow a user to enter information that may be analyzed. While this type of software permits the creation of lists, reports, charts, tables, graphs and other forms of output, the use of such programs generally requires training and specialized knowledge of the software program.

In summary, neither word processing programs nor database programs provide a means for a novice computer user to enter, manage, and analyze information on a computer system using a natural user interface. On the one hand, word processing programs provide a way to present information in a visually pleasing manner, but do not allow a user to do something with the information other than view it. On the other hand, database programs allow information to be analyzed, but require special training to make them useful. When a novice computer user wants to start from an empty canvas, and identify and analyze information, he or she still reaches for a pen and pad of paper. Even experienced computer users reach for a pen and pad of paper when they first commence thinking about a problem, but have not yet generated or identified enough information to make worthwhile the creation of a spreadsheet or database.

When using pen and paper, many have turned to the concept of a semantic network to organize their thoughts. A semantic network is a knowledge representation paradigm that has been the subject of research in artificial intelligence since the 1960's. The idea is that knowledge consists of objects and their relationships to each other. The objects are represented by nodes and the relationships are represented by labeled arcs between the nodes. On paper, semantic network are often represented as a number of data-containing nodes as objects, with labeled arcs linking related nodes.

As an alternative to traditional word processing and database programs, there have been prior attempts to provide computer software for the creation of semantic networks. The computer software product known as InfoCentral, which was first marketed by WordPerfect, is one such attempt. In the InfoCentral product, a user creates what is known in that program as an "intelligence base" or "iBase" for a certain topic. To build an iBase, a user first selects the "add" function to add an object to the iBase. The user then enters the name of the object and is prompted for a category to which to assign the object. Default categories include person, organization, place and event. The user then adds additional objects to the iBase. After there are at least two objects in an iBase, the user may add connections between objects using the "connect" function. The user may define connection types or select from default connection types. For example, an employee connection could be used to connect a person and an organization, or a friend connection could be used to connect two people. After data has been entered, the InfoCentral product provides limited features for viewing the data and creating files related to the data for use with other computer software programs.

The InfoCentral product is limited in at least five significant respects. First, the natural feeling of pen and paper is totally absent from the InfoCentral user interface. Instead of allowing the user to enter information on a blank window, "add" and "connect" buttons, which call separate pop-up text windows, are used to enter object names, object types, and connection types. Second, a user must know something about his or her topic before using the software program. In an InfoCentral iBase, a user is prevented from entering information without also assigning relationship information at its time of entry, because each object must be assigned an object category and each connection a connection type at the time such information is entered. Third, the InfoCentral product displays information in a controlled and rigid format. InfoCentral does not allow a user to organize information contained in a semantic network into summary list boxes and tables with the click of a mouse button. Fourth, because InfoCentral does not have the ability to display information in list boxes and tables, it is not possible to query such data structures to provide an information management system. Fifth, InfoCentral does not permit arcs in a semantic network to be used as sources or destinations for new arcs. Rather, InfoCentral follows strict rules for the creation of semantic networks in which arcs may only be used to connect nodes.

SUMMARY OF THE INVENTION

The present invention is a new type of computer software and user interface.

This software and its user interface overcome the limitations of the prior art to provide a system for entering and managing information on a computer using a natural user interface. Like word processing and graphic programs, the software allows the entry and display of information in a flexible format. Like spreadsheet and database programs, the software allows information to be manipulated and query operations to be performed. However, unlike previous attempts to merge these qualities in a single software application, the software provides a natural user interface similar to pen and paper, yet does not require prior knowledge about a topic or extensive user training to be a valuable tool for information management.

The present invention accomplishes these goals by providing a user with a blank sheet for data input, which is represented as an empty window on the computer display. The user selects any portion of the empty window for inputting an object, which can be any type of data or information. Additional objects may be entered in other portions of the window. When the user discovers that two or more pieces of information are related, the related items may be connected with labeled arcs or links. Alternatively, where the user wants to add directly to the window information that relates to an object or an arc already on the window, the new object and a new labeled arc may be added at the same time. The software provides for viewing the data and structures related to the data, including list boxes and tables. The software provides for querying these advanced structures and for creating files related to the data for use with other computer software programs.

The software is designed to enable the efficient input, storage, manipulation, extraction and analysis of loosely structured and unstructured data. Unlike database systems which require that data first be organized in tables, records and fields, the software allows the user to enter data without contemplating an overall structure and without forcing the data entry to conform to predetermined categories. Data is captured as it is discovered or generated in the course of business, and a structure for the data emerges naturally as an incident of data entry. Because it does not demand a rigid structuring of data, the software brings the power of database searching and analysis to domains where the nature and scope of information generated may be unpredictable in advance of its discovery or production.

DESCRIPTION OF THE FIGURES

The foregoing advantages of the present invention are apparent from the following detailed description of the invention with reference to the drawings, in which:

FIGS. 3A–3H show a semantic network and screen displays relating to the network;

FIGS 5A–5M show advanced options available for viewing semantic networks;

FIGS. 8A–8B show an application of the invention for Internet Management;

DESCRIPTION OF THE PREFERRED EMBODIMENT

Figure 1:
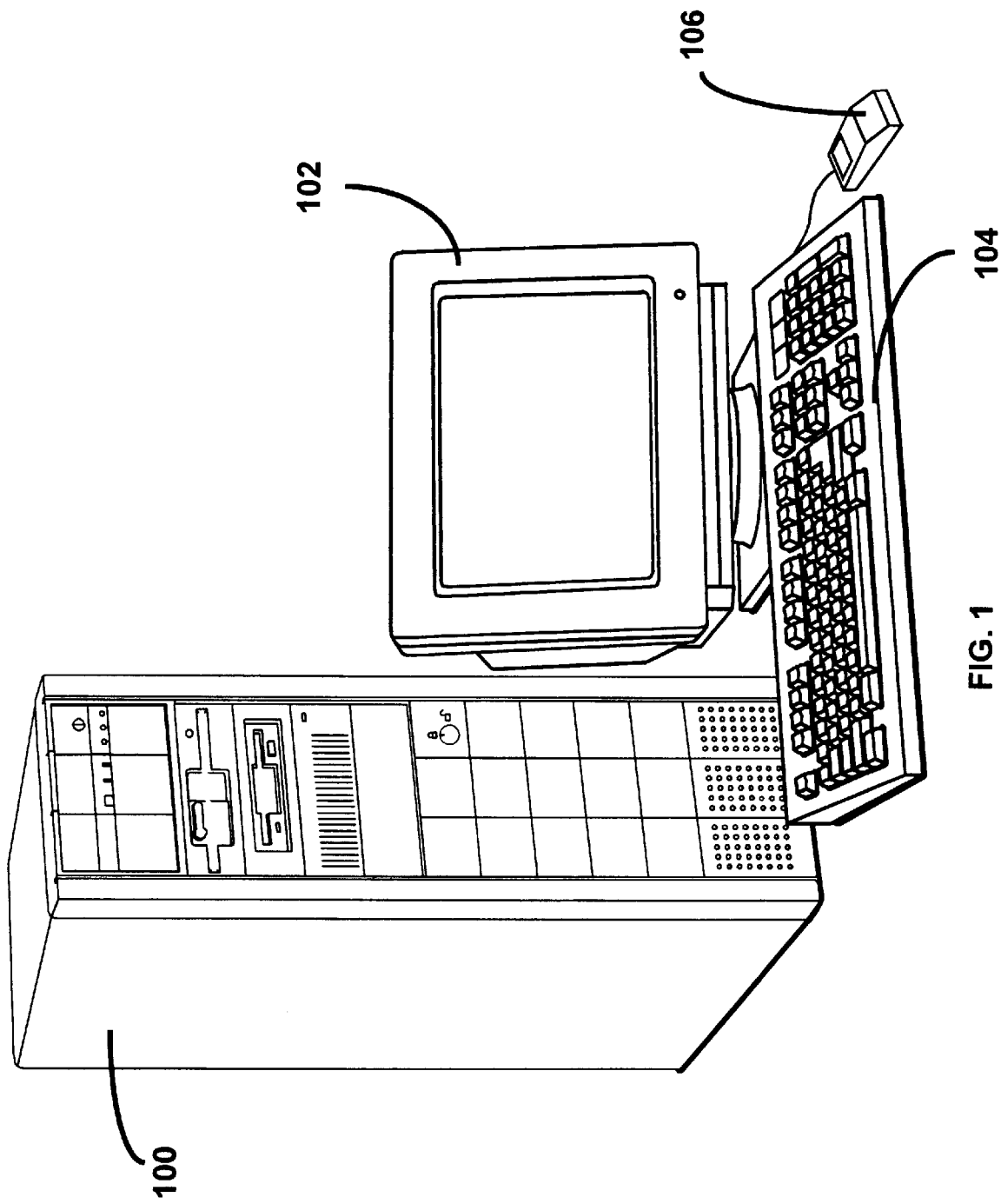
FIG. 1 shows an illustrative computer system.

FIG. 1 shows an illustrative computer system 100 to which the present invention applies. Computer system 100 contains data storage devices, a central processing unit, a power source, and connections for external devices. External devices typically connected to computer system 100 include one or more output devices, such as video monitor 102, and one or more input devices, such as keyboard 104 and pointing device 106. Computer system 100 may be any of several commercially available computer systems available from Apple, Compaq, Digital, Hewlett Packard, IBM and others. Those of ordinary skill in the art may select and implement the present invention on other computer systems.

Figure 2:
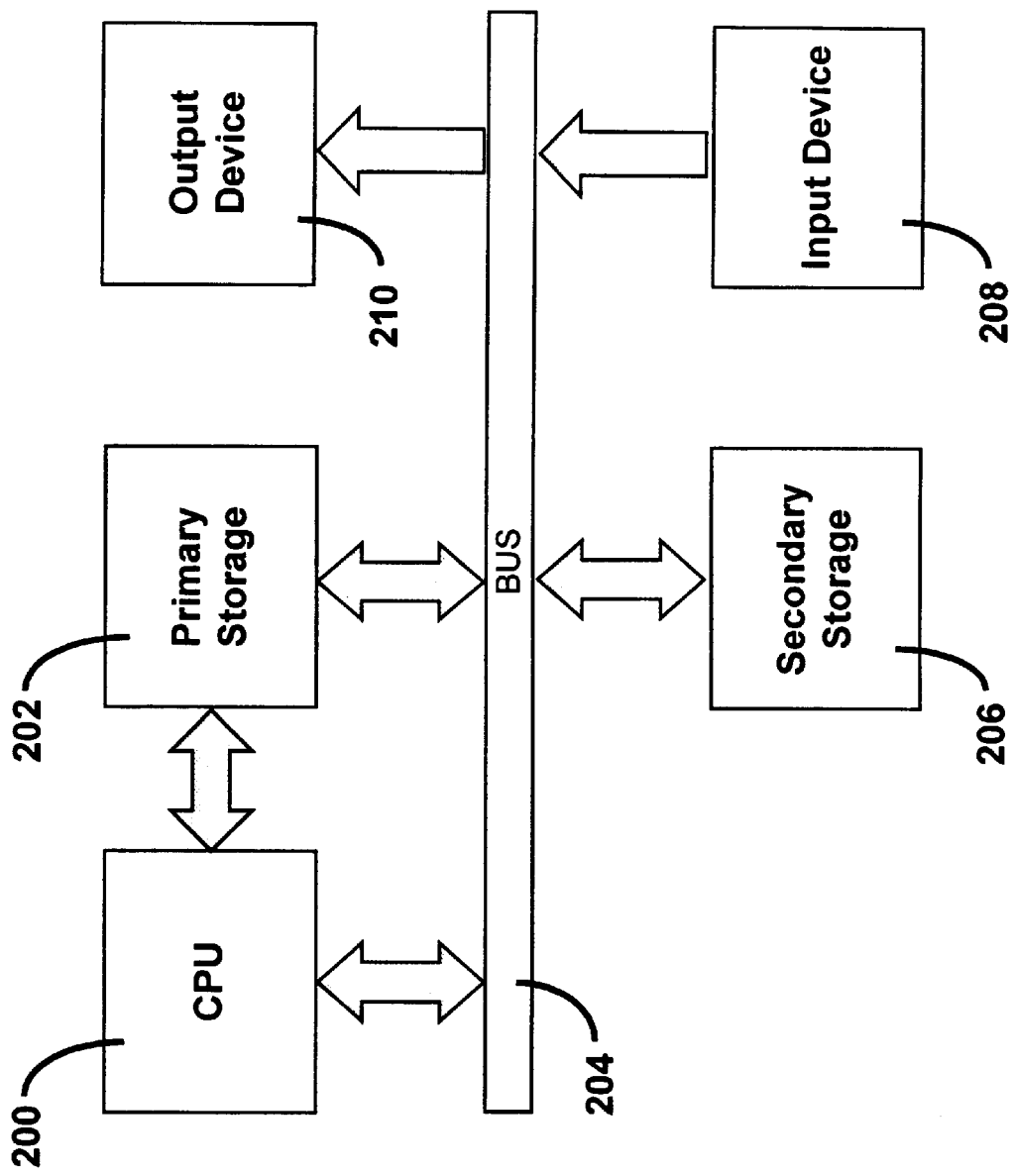
FIG. 2 shows a block diagram of the components of the computer system.

FIG. 2 shows a block diagram of the components of a computer system to which the present invention applies. Central processing unit 200 contains one or more microprocessors for executing the computer software programs necessary to implement the present invention. Central processing unit 200 is typically connected to primary storage 202 and system bus 204. Primary storage 202 is typically volatile storage, such as RAM. The programs and data for implementing the present invention are stored on a temporary basis in primary storage 202 during execution. Typically, only a portion of the programs and data fit in primary storage 202 at any particular time. Cache memory may also be included with central processing unit 200 or primary storage 202 to speed program execution.

System bus 204 connects the components of the computer system, and may be based on an open architecture, such as Peripheral Component Interconnect (PCI), or on a proprietary design. Several devices are connected to system bus 206. Secondary storage 206 is typically nonvolatile storage, such as an optical or magnetic disk drive. The programs and data for implementing the present invention are stored on a permanent basis in secondary storage 206. Input device 208 may include keyboard 104 or pointing device 106, and output device 210 may include video monitor 102. In some computer systems, input device 208 and output device 210 are connected directly to central processing unit 200, rather than through system bus 204.

Figure 3A:
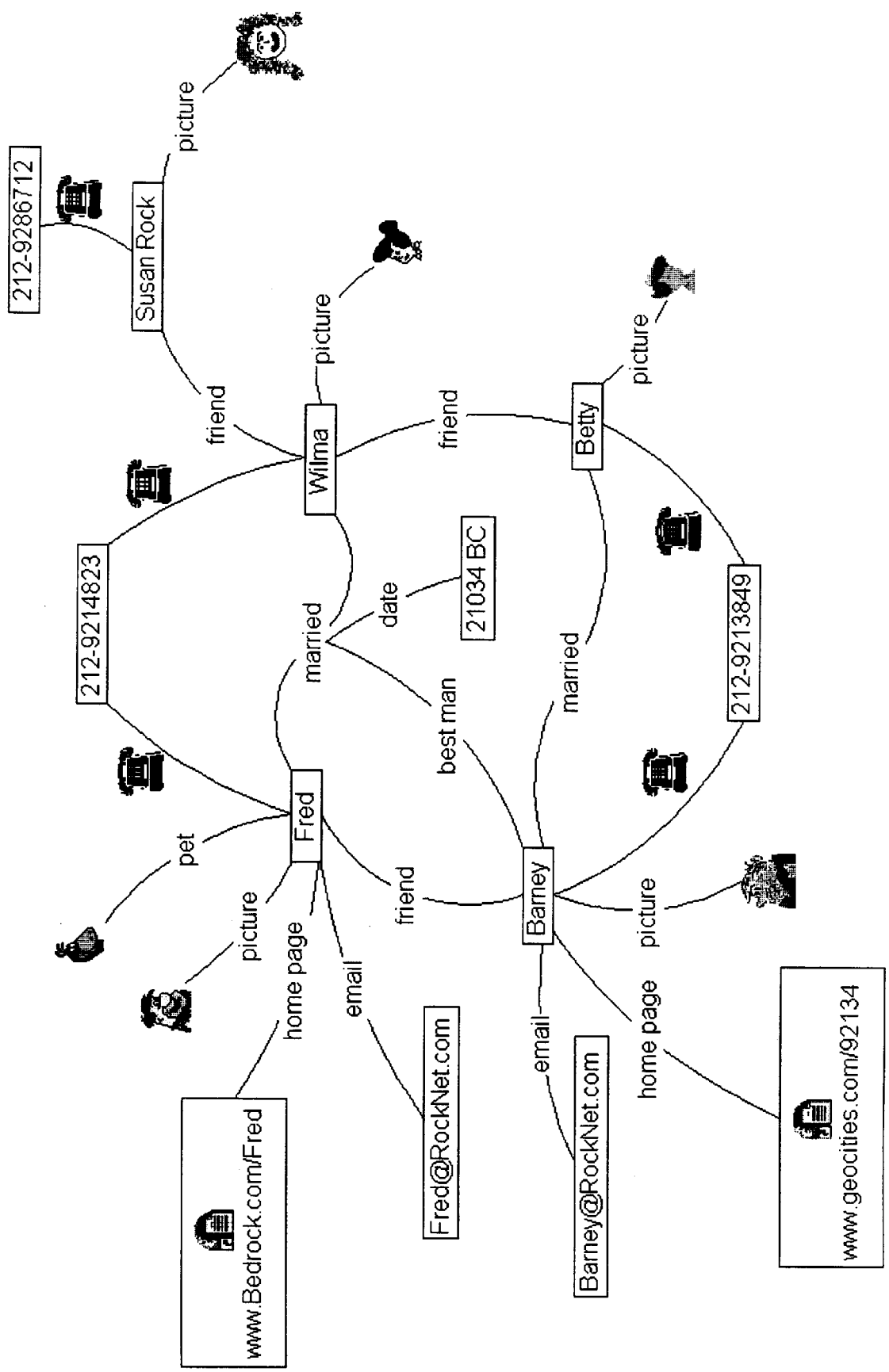
Figure 3B:
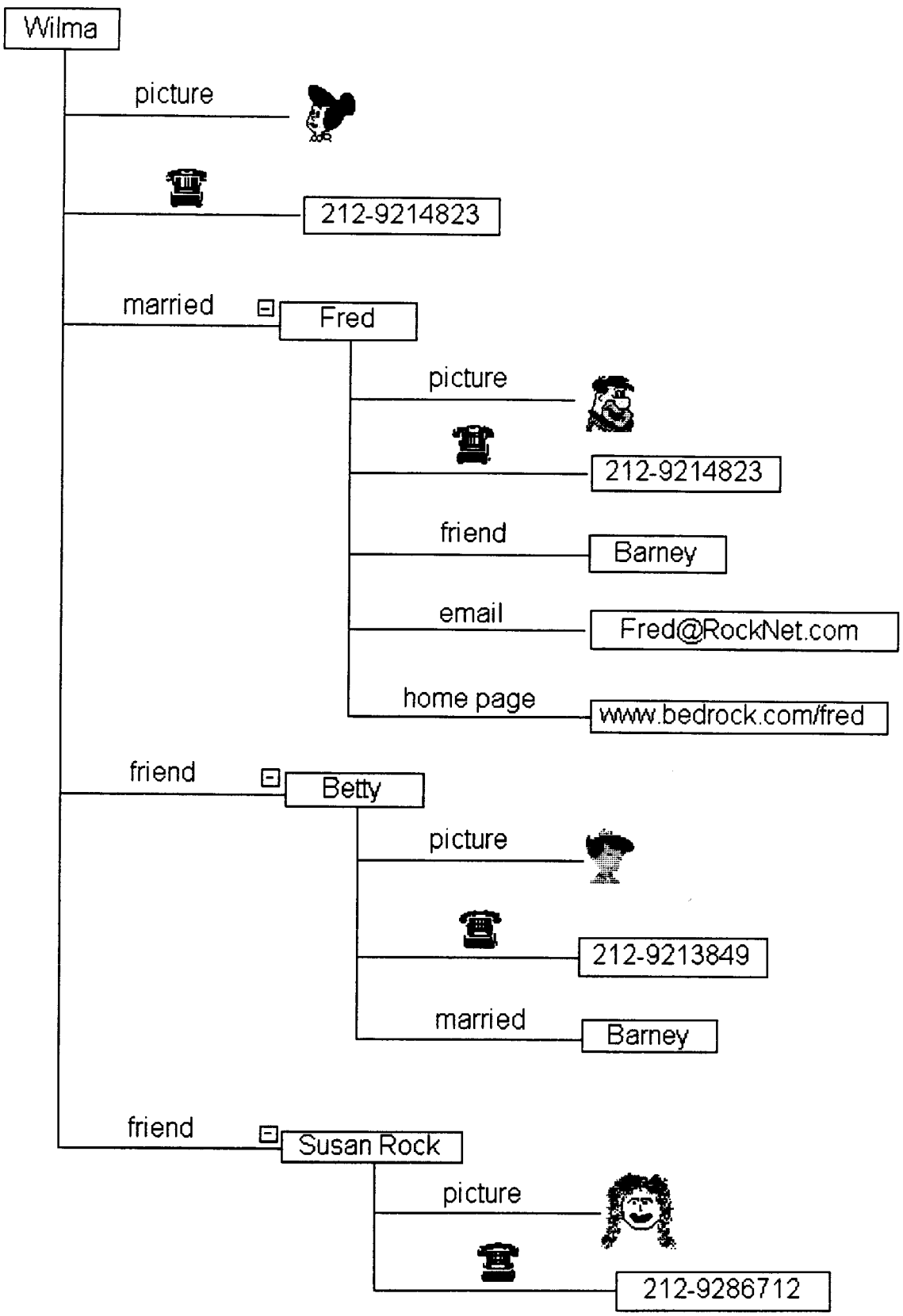
Figure 3C:
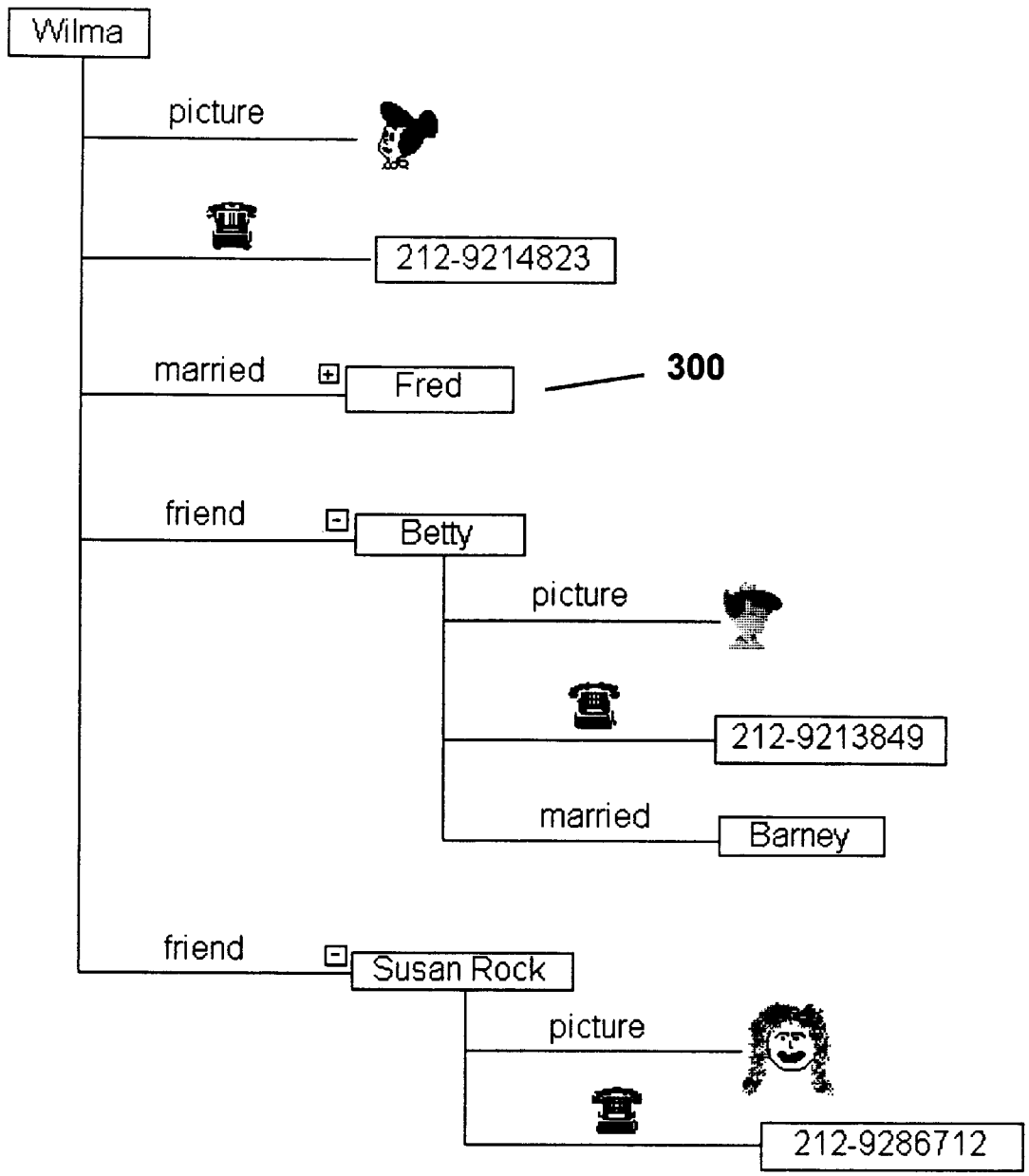
Figure 3D:
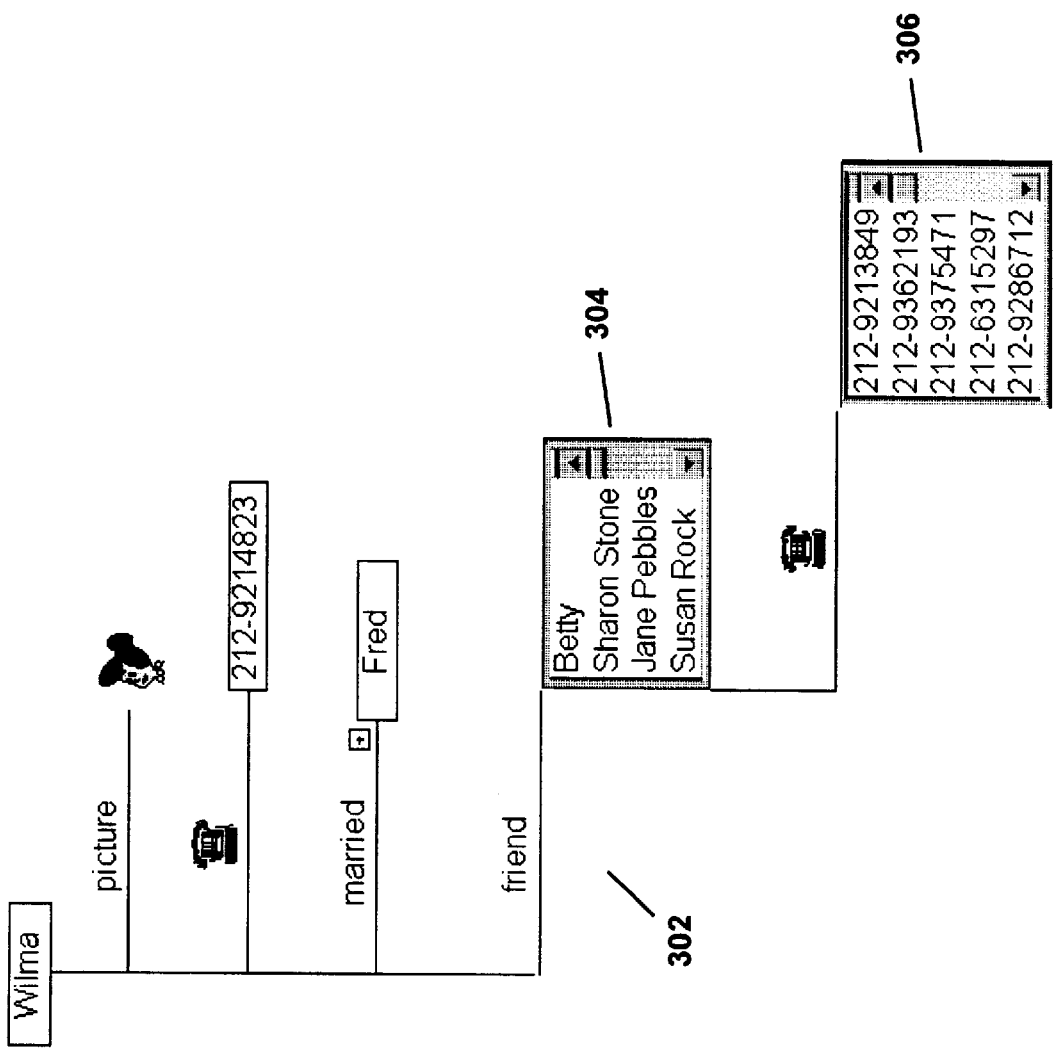
Figure 3E:
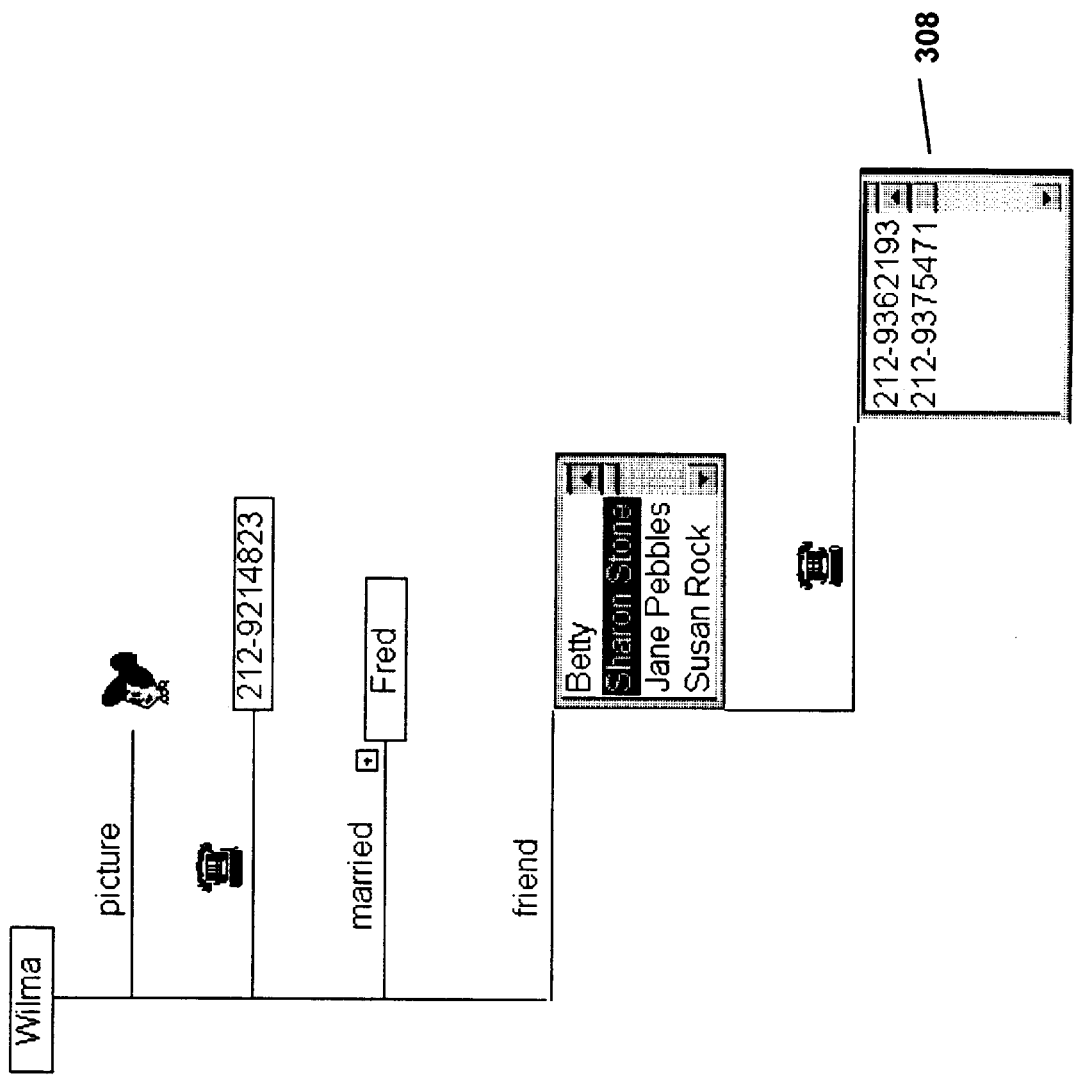
Figure 3F:
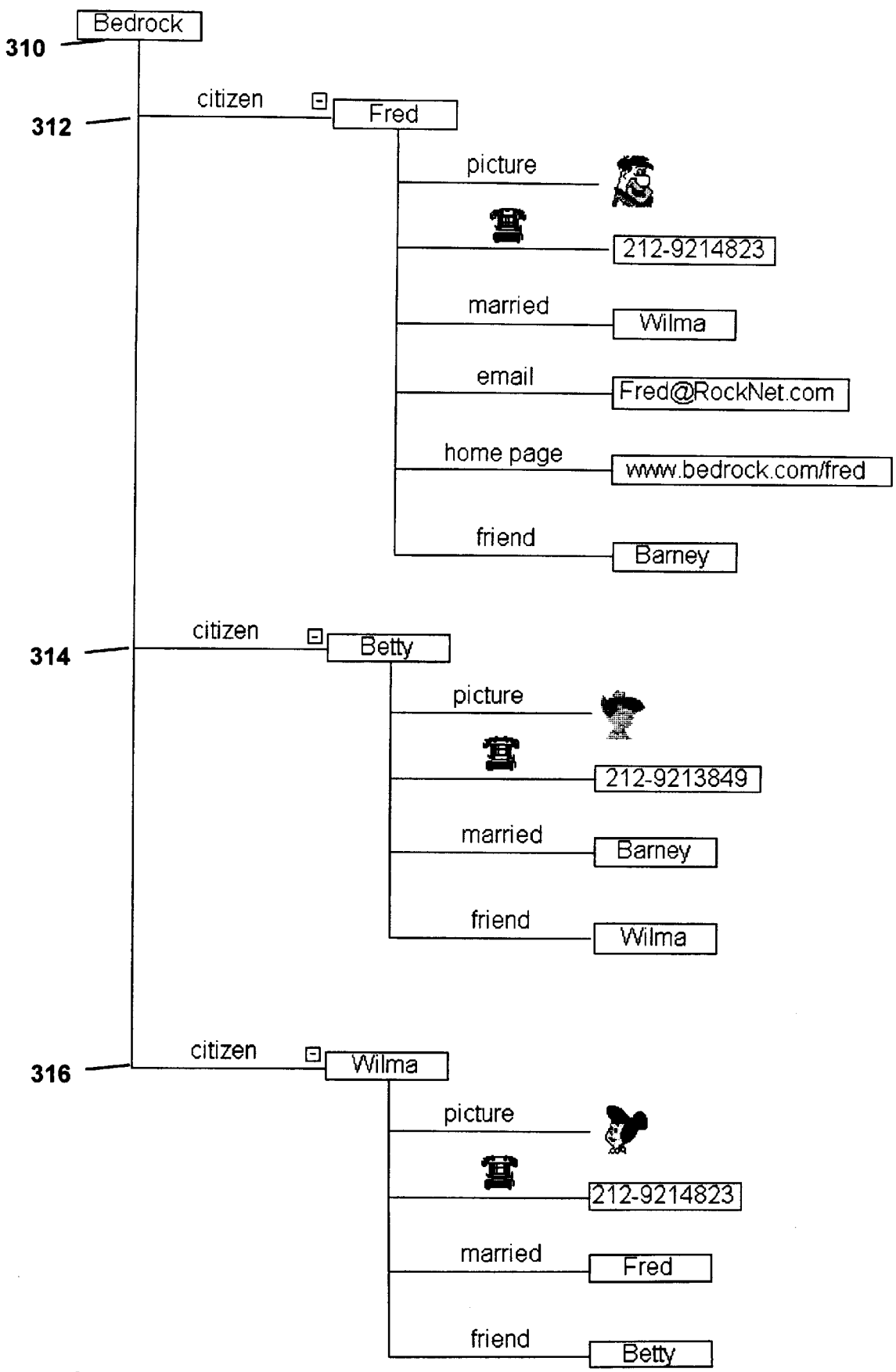
Figure 3H:
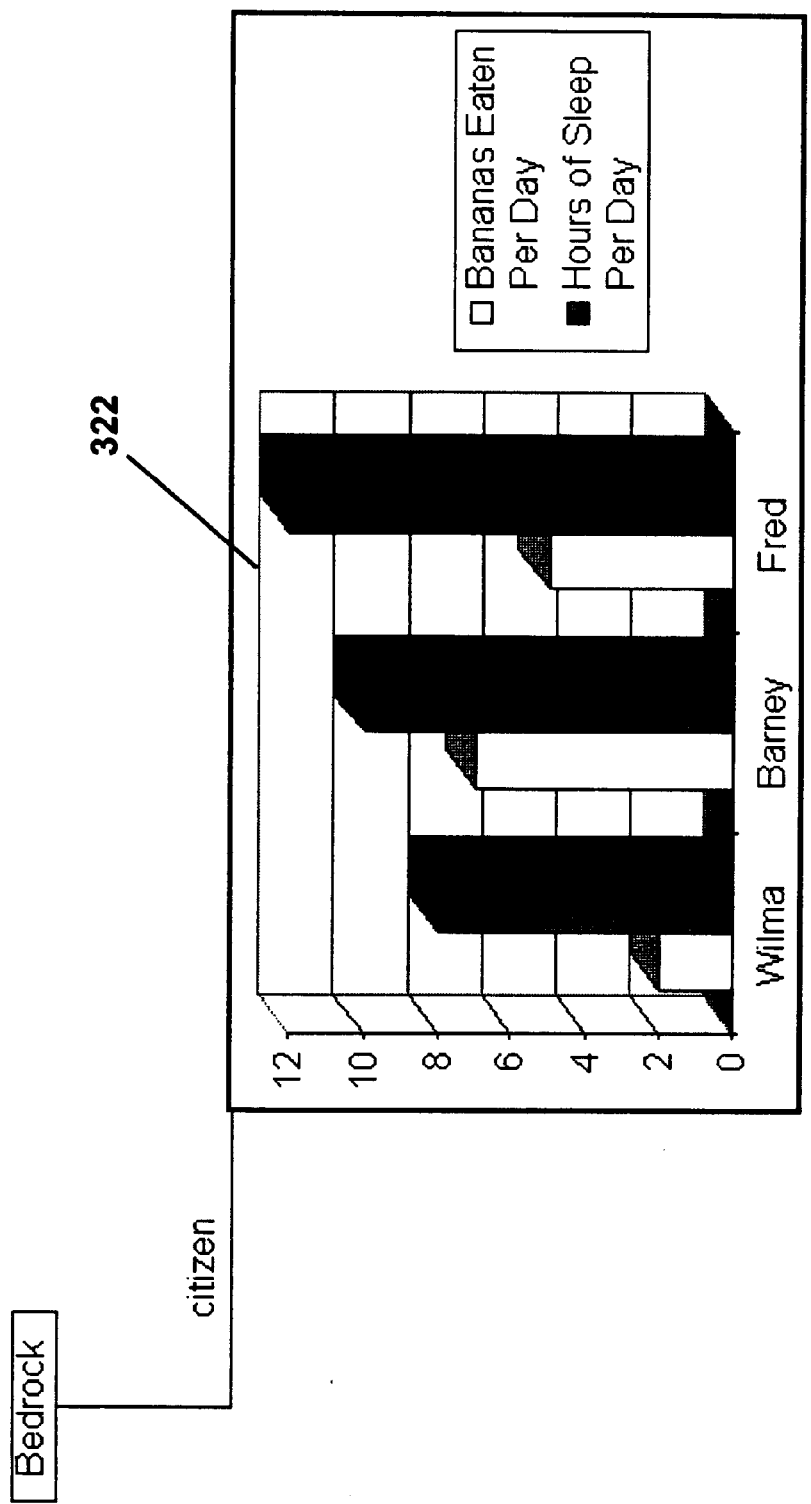

FIGS 3A–3H show a semantic network and renderings relating to the network. FIG. 3A shows a semantic network for objects and relationships in the town of Bedrock, as popularized by the cartoon, The Flintstones. (The Flintstones show, characters, and marks are the property of Hanna-Barbera, and are used herein for illustration purposes only.) FIG. 3A shows information as it might be written on paper. Using the software of the present invention, the same information may be entered into a computer and displayed as the web shown in FIG. 3B. Using the software, this and similar information may be manipulated to produce the modified webs shown in FIGS. 3C–3H. In FIG. 3C, Fred node 300 is collapsed, so that the information associated with Fred is not displayed. In FIG. 3D, friend node 302 is grouped, so that the names of Wilma's friends are grouped into friend list box 304 and their collective phone numbers are grouped into phone list box 306. FIG. 3E shows the web from FIG. 3D where the phone numbers associated with one of Wilma's friends, Sharon Stone, are selectively grouped into phone list box 308. FIG. 3F shows a variation of the web, where Bedrock node 310 and citizen arcs 312, 314, and 316 are added. This figure links Fred, Betty, and Wilma as citizens of Bedrock. FIG. 3G shows the data from FIG. 3F grouped into table 320. FIG. 3H shows data grouped into chart 322 to reflect banana consumption and sleep patterns for Wilma, Barney, and Fred.

The user interface of the present invention is graphical in nature, and it is necessary to implement the invention in a computer environment that supports graphic windows. The present invention has been implemented in the Microsoft Windows 95 operating system environment, but other operating systems may be used. These other operating systems include Apple's Macintosh O/S, Microsoft's other windows-based operating systems, IBM's OS2, XWindow environments for UNIX computers, and any other operating system that supports graphic windows, including an "applet" or application implemented to run in a World Wide Web browser.

Figure 4B:
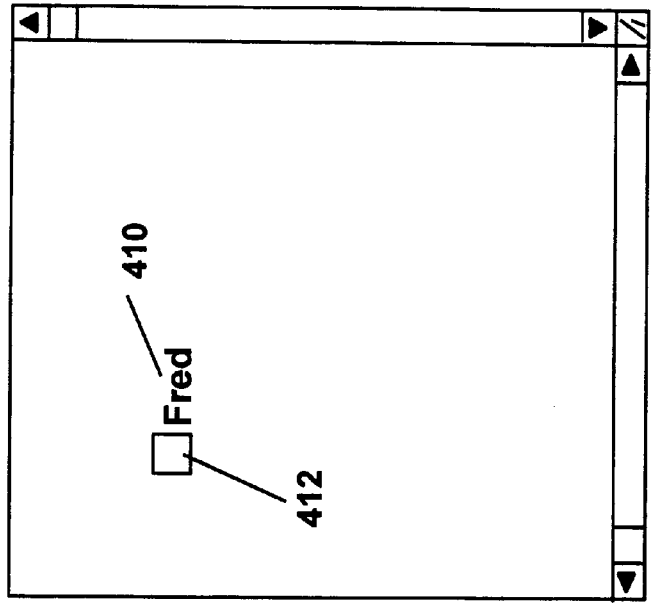
FIGS. 4A–4H show the entry of a semantic network.
Figure 4A:
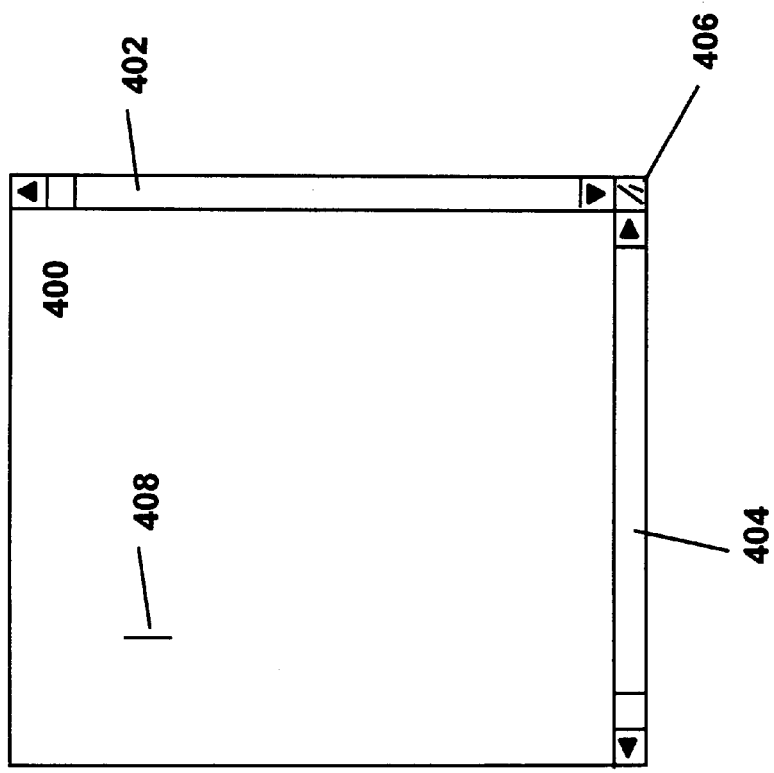

The entry of a semantic network using the inventive user interface is shown in FIGS. 4A–4H. FIG. 4A shows window 400, which is a blank sheet presented to the user for data input. Window 400 includes optional scroll bars at the right 402 and at the bottom 404 of the window, which are used to move to undisplayed portions of the window. Window 400 also includes optional resize box 406, which is used to change the size of the displayed window. Cursor 408 is used to enter information, and is typically displayed by clicking a button on pointing device 106 when the operating system's pointer is within any portion of window 400. Scroll bars 402 and 404, resize box 406, and cursor 408 all function in an ordinary windows-type way.

FIG. 4B shows the window from FIG. 4A after the user has entered object 410. In the present example, object 410 is text information shown as "Fred" in FIG. 4B. Such text information is typically entered through keyboard 104, but other methods of entry may be used. Although text objects are used in this example, objects include all types of information and data that are recognized by the computer environment on which the software resides. For example, with Microsoft Windows 95, objects include text data, picture data, Internet links, files, and other items. Button 412 is associated with object 410. In FIG. 4B, button 412 is shown as an empty button, because object 410 has no descendants.

Figure 4D:
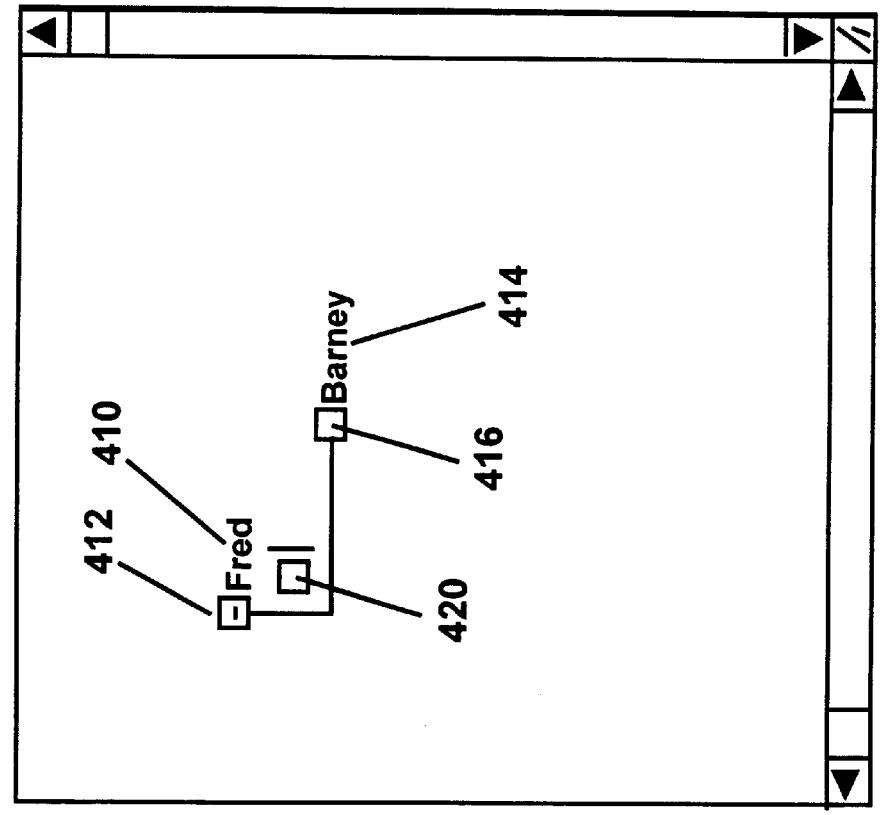
Figure 4C:
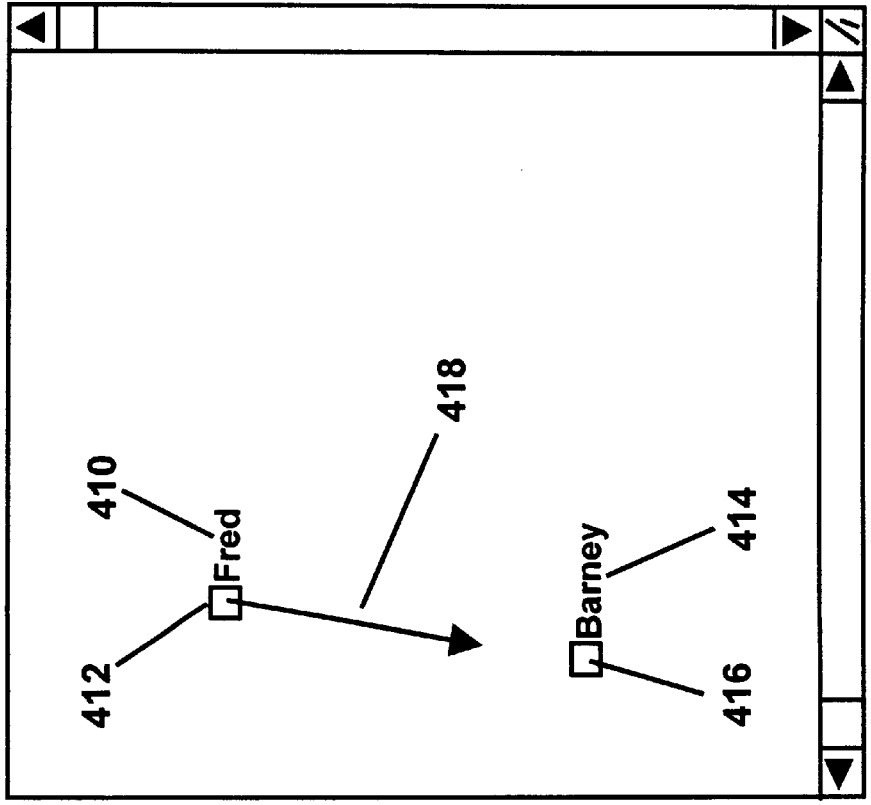

FIG. 4C shows the window from FIG. 4B after the user has added object 414 and has begun the process of connecting objects 410 and 414. Object 414 is text information shown as "Barney", and the object also includes button 416. To connect objects 410 and 414, the user clicks on button 412 associated with object 410 and drags line 418 to button 416 or anywhere else in the rectangular region occupied by object 414. When the end of line 418 is anywhere over object 414 or button 416, the user releases the mouse button to establish the connection. The first item selected is the parent, and the second item to which line 418 is dragged is the destination of the descendant arc. The software redraws the window with Barney object 414 beneath Fred object 410, as shown in FIG. 4D. The software positions cursor 408 next to button 420, where the user may optionally label the arc between objects 410 and 414, or leave the arc label blank for future input. Button 412 is updated to include a minus sign. Following the convention used in Microsoft's operating systems, inclusion of a minus sign in a button indicates that descendants of an object are shown. A plus sign in a button indicates that descendants of an item exist, but that they are not shown. A display consisting solely of Fred object 410 with button 412 including a plus sign could be generated by clicking on button 412. Clicking again on button 412 regenerates the display shown in FIG. 4D. An empty button indicates that there are no descendants associated with the item to which the button pertains.

Figure 4F:
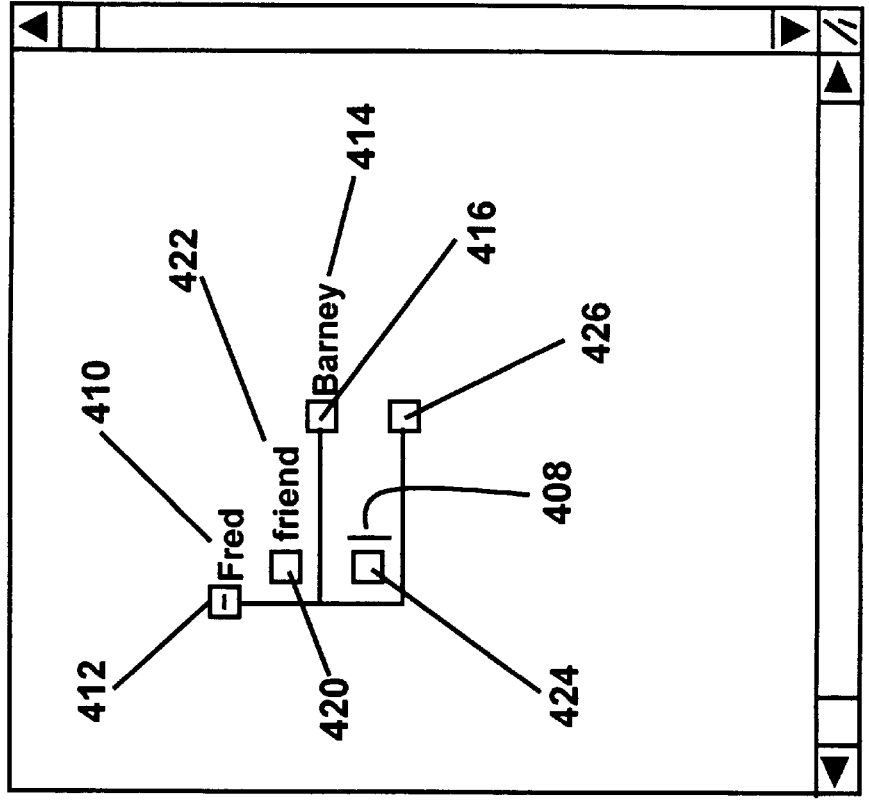
Figure 4E:
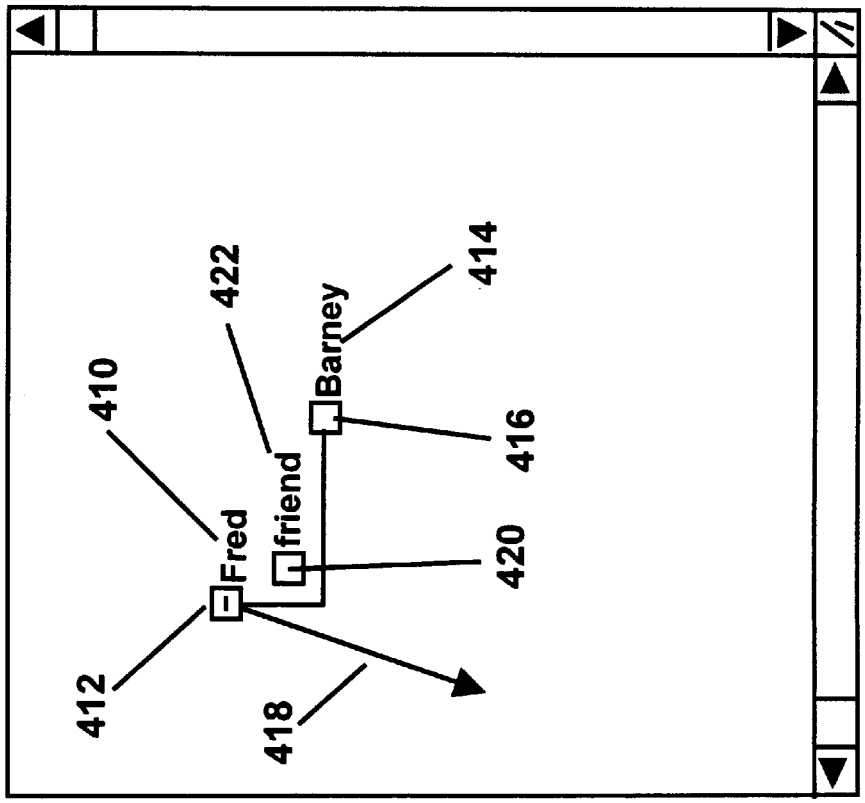
Figure 4H:
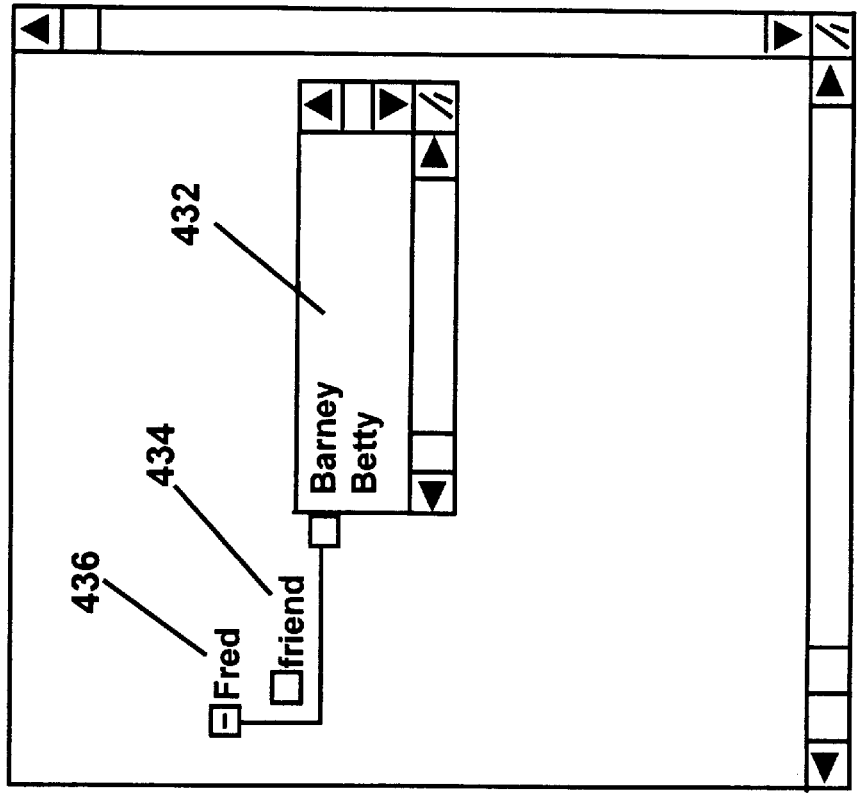
Figure 4G:
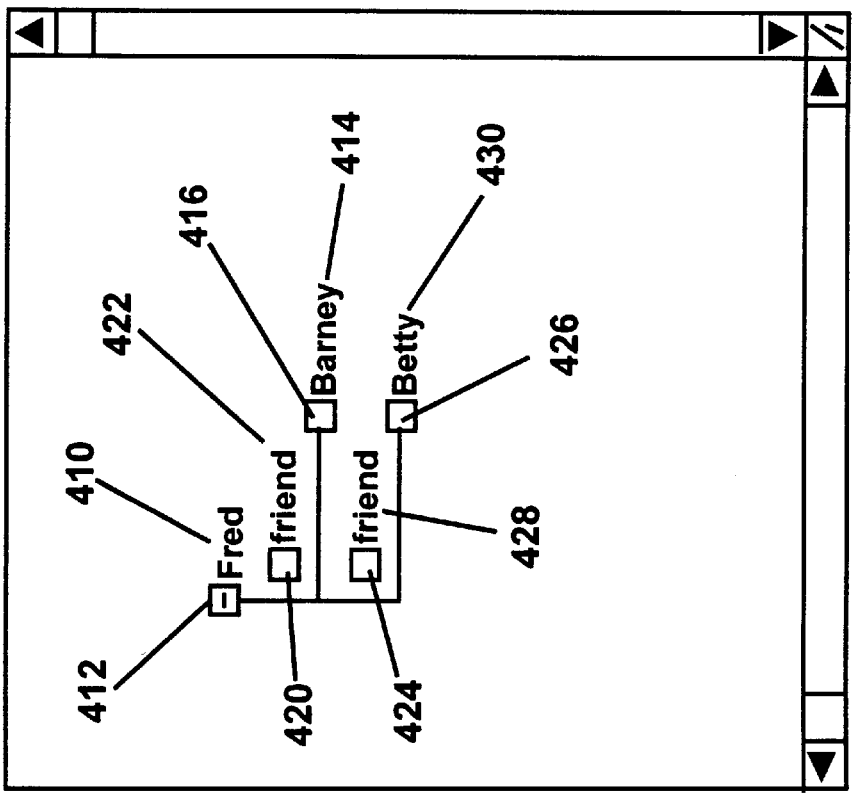

FIG. 4E shows the window from FIG. 4D after arc information has been associated with button 420. Arc 422 includes the text information shown as "friend", which denotes that Fred and Barney are friends. FIG. 4E also shows how to enter a new arc and a new object in one operation. This is done by clicking on button 412 associated with object 410; dragging line 418 to any empty portion of the window; and releasing the mouse button. The software redraws the window with button 424 for a new arc and button 426 for a new object, as shown in FIG. 4F. The software positions cursor 408 next to button 424 for entry of the new arc information. FIG. 4F shows that object buttons are connected as part of the web, while arc buttons are placed near, but not connected to the web. This is not critical, however, and other configurations and spacings of object and arc buttons are anticipated. FIG. 4G shows the window from FIG. 4F with the new arc data "friend" at 428 and the new object data "Betty" at 430. FIG. 4H shows an advanced display option for the semantic network shown in FIG. 4F, in which Fred's friends have been grouped together into friend list box 432 under friend arc 434.

Figure 5A:
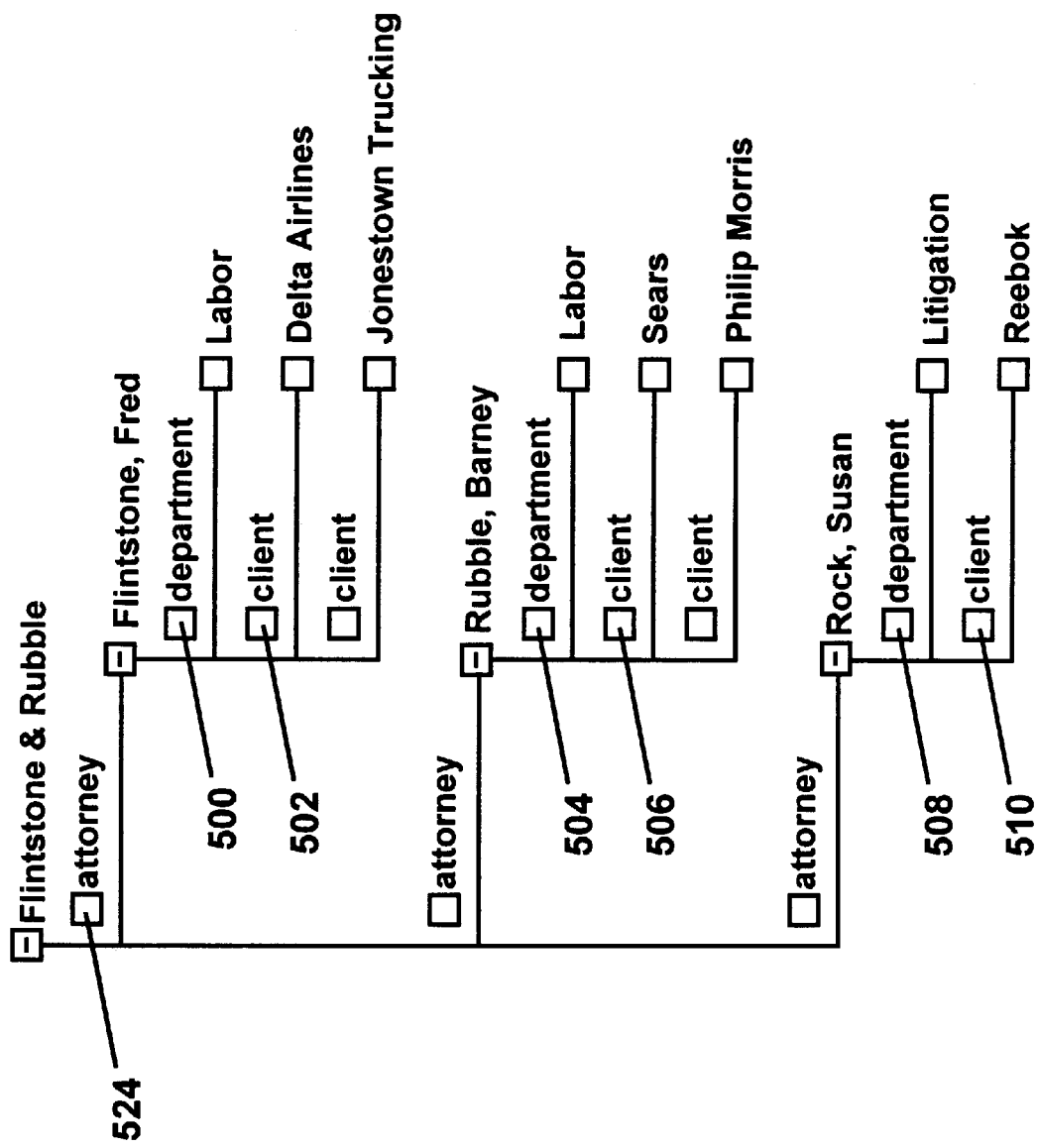
Figure 5B:
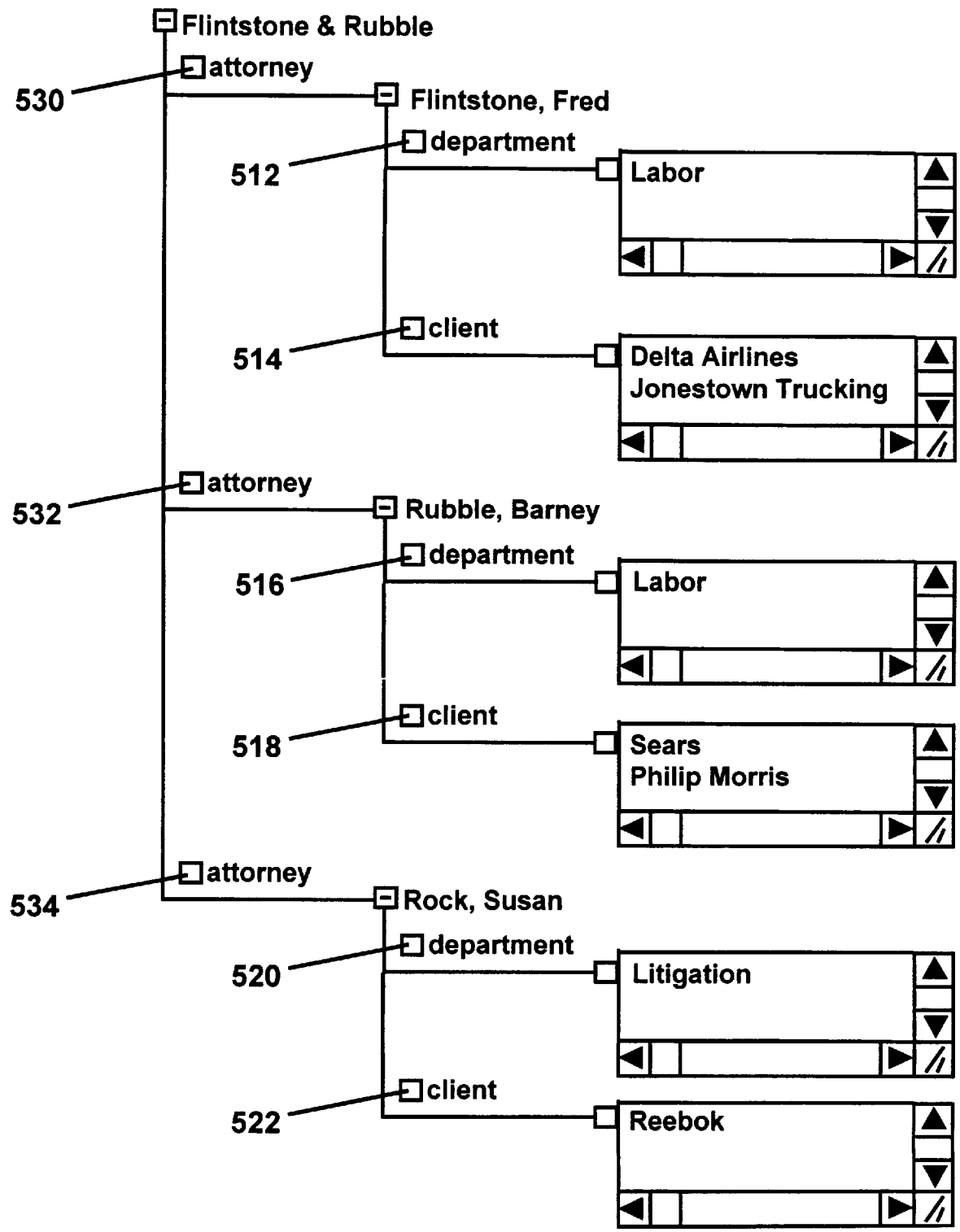

FIGS 5A–5M show advanced options available for viewing semantic networks. FIG. 5A shows an illustrative semantic network, as entered into the software. The network shows a law firm consisting of three attorneys and their respective departments and clients as part of the web. FIG. 5B shows the same data as that shown in FIG. 5A in a different format. In FIG. 5B, the department and client data for each attorney have been grouped into list boxes. A user would accomplish this grouping by activating a group function through a shortcut menu, tool bar, pulldown menu, or some other way. In one implementation of the software, a user clicks the right mouse button over an arc button to obtain a shortcut menu, from which the group function is selected for the given arc. The software redraws the web with the destinations of the arc grouped into a listbox. FIG. 5B shows the semantic network from FIG. 5A after the group function has been selected for buttons 500, 502, 504, 506, 508 and 510. To return to FIG. 5A, one would perform a complementary ungroup function on buttons 512, 514, 516, 518, 520 and 522. Global grouping and ungrouping functions may also be provided. For example, using the group function on button 524 could perform a global group function for all descendants to arrive at the display in FIG. 5C without the need to first group at the level shown in FIG. 5B. An equivalent global ungroup function on button 542 could be used to return to the display of FIG. 5A. Other creative uses of global functions may be implemented.

Figure 5C:
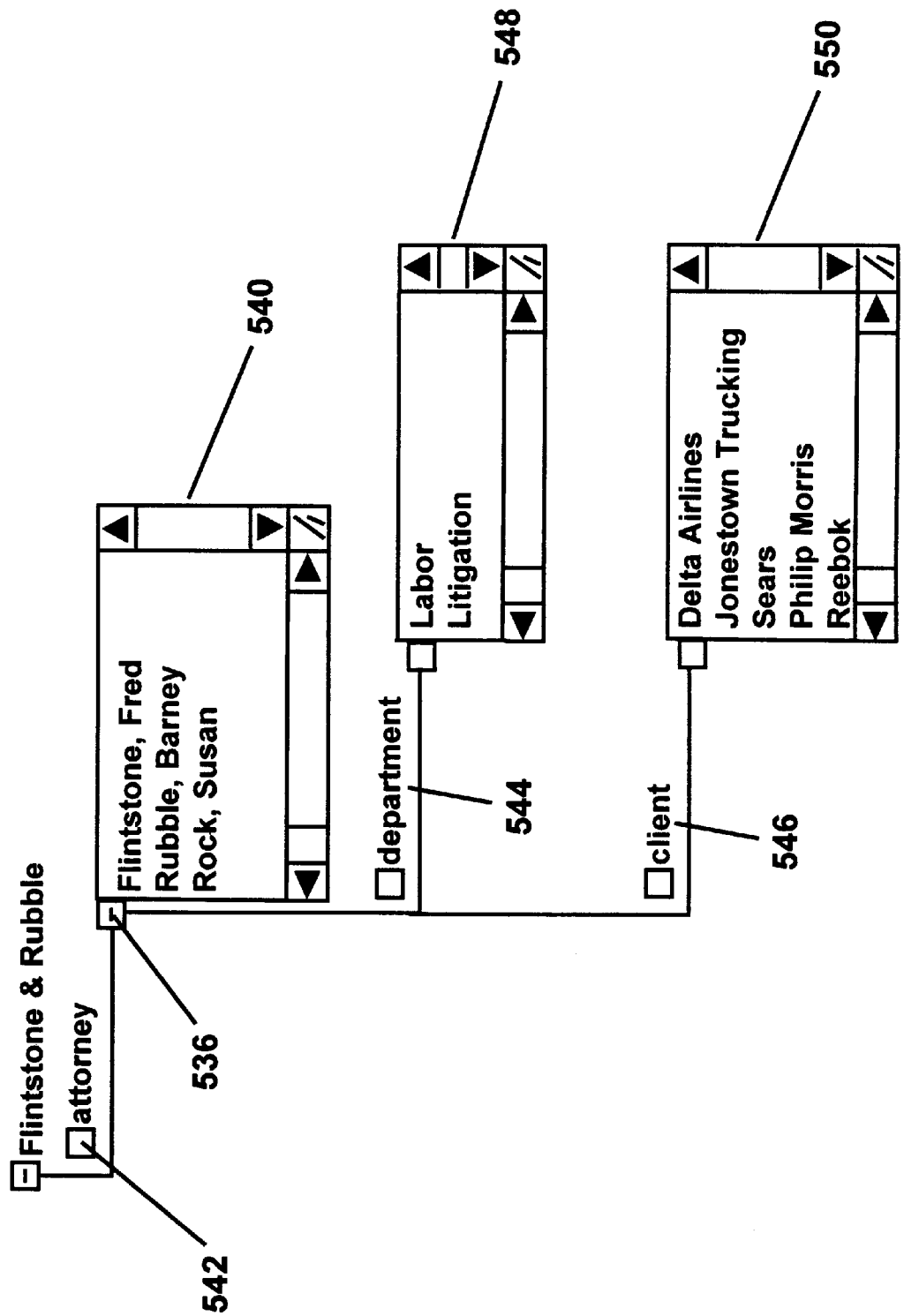
Figure 5D:
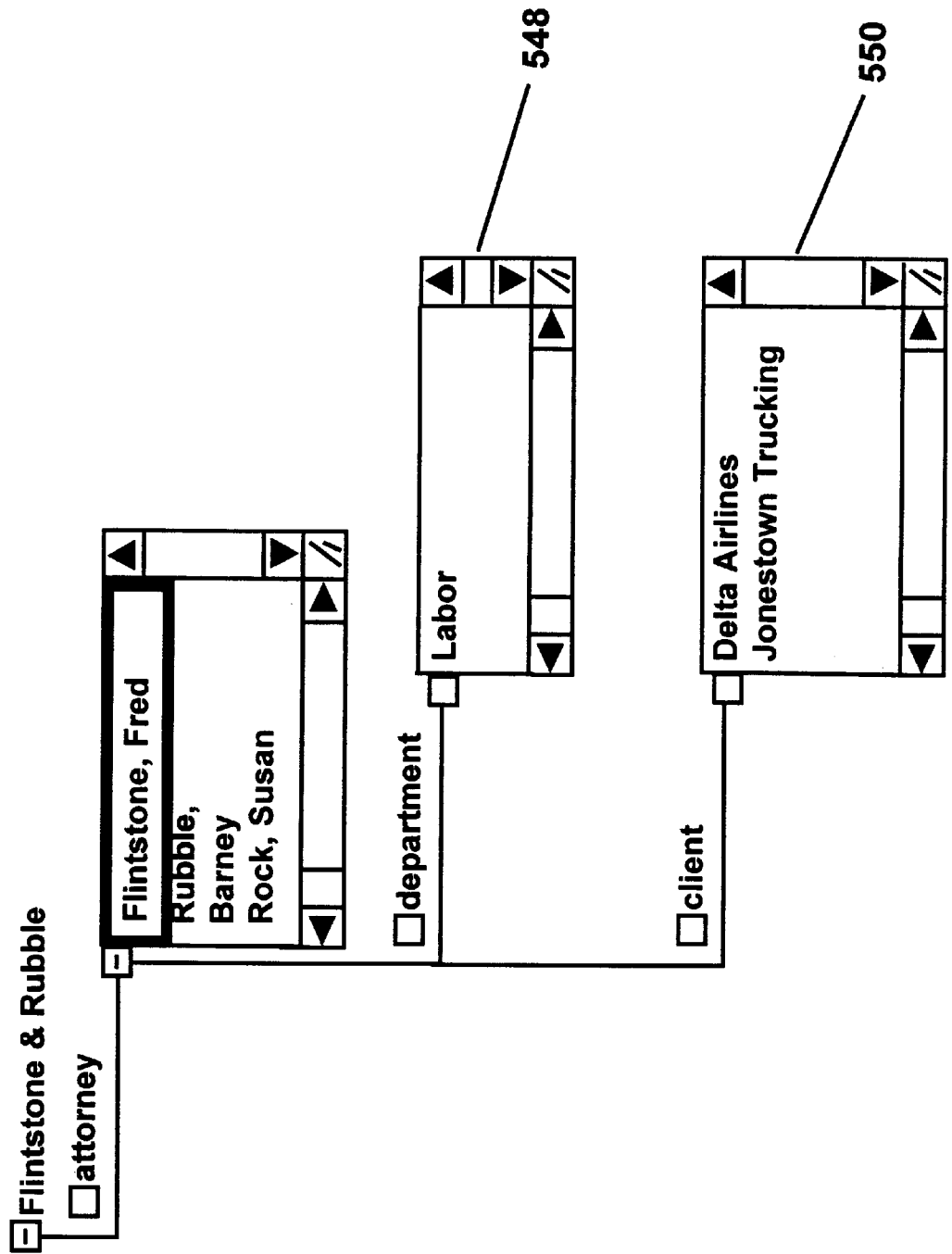

To obtain FIG. 5C from FIG. 5B, one would perform a group function on any of buttons 530, 532 or 534. The software redraws the web with the three groupings shown in FIG. 5C for attorney, department, and client. The software then enables one to perform queries in a user-friendly and simple way. For example, FIG. 5D shows that where a particular item in the attorney listbox is selected, the department and client listboxes are redrawn to show only that attorney's department and clients. Other query options and query results are and could be provided. For example, the software could enable the selection of multiple items in one or more list boxes, or the software could display results by highlighting search hits as an alternative to erasing search misses. FIG. 5E shows the table option available in the software. To obtain FIG. 5E, one would perform a table function, invoked in a way similar to the group function, using button 536 in FIG. 5C. The software redraws the web with table 538 shown in FIG. 5E, which collects attorney, department and client information into one object. The software could optionally generate the table in other forms, or format the table to be compatible with other software applications, such as spreadsheet and database programs. Other complex features may be implemented in the software, such as a feature for generating charts or graphs for suitable table data.

Figure 5G:
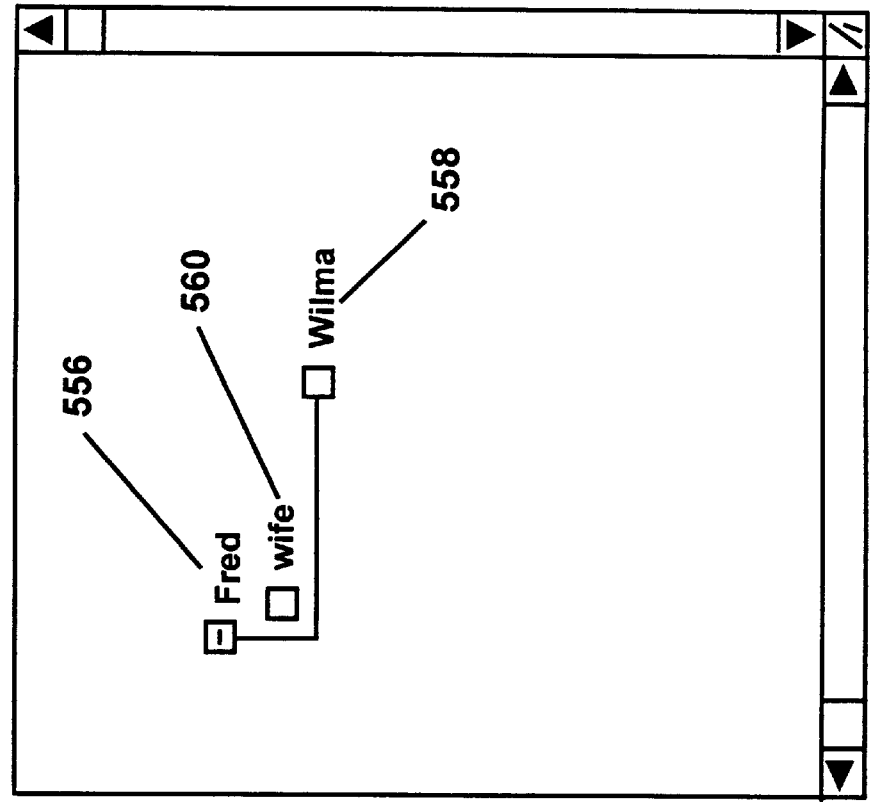
Figure 5F:
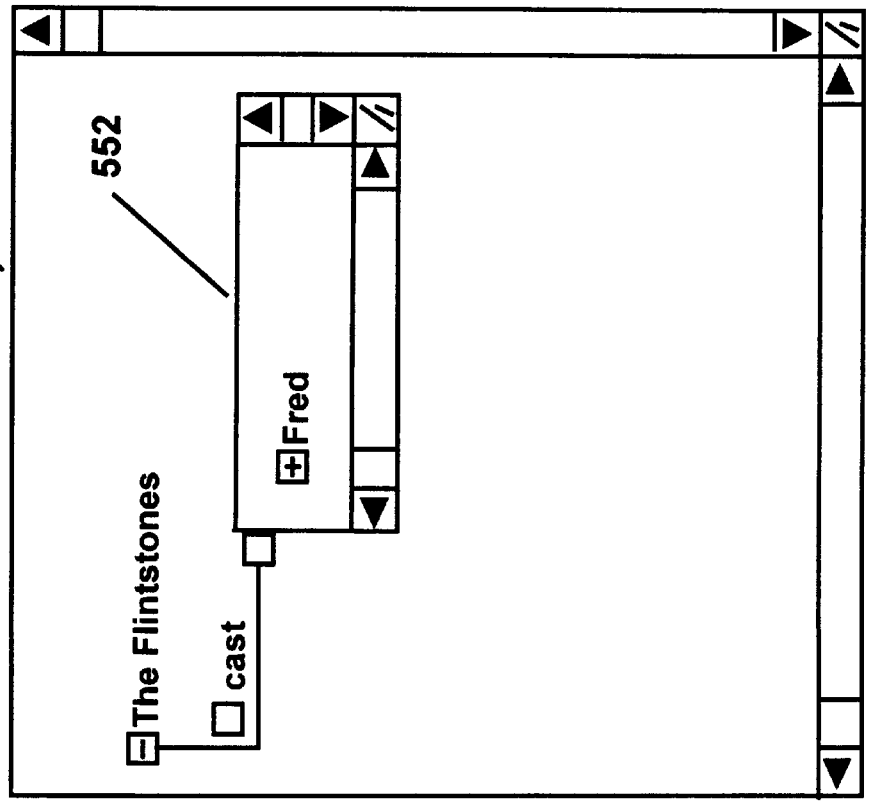
Figure 5I:
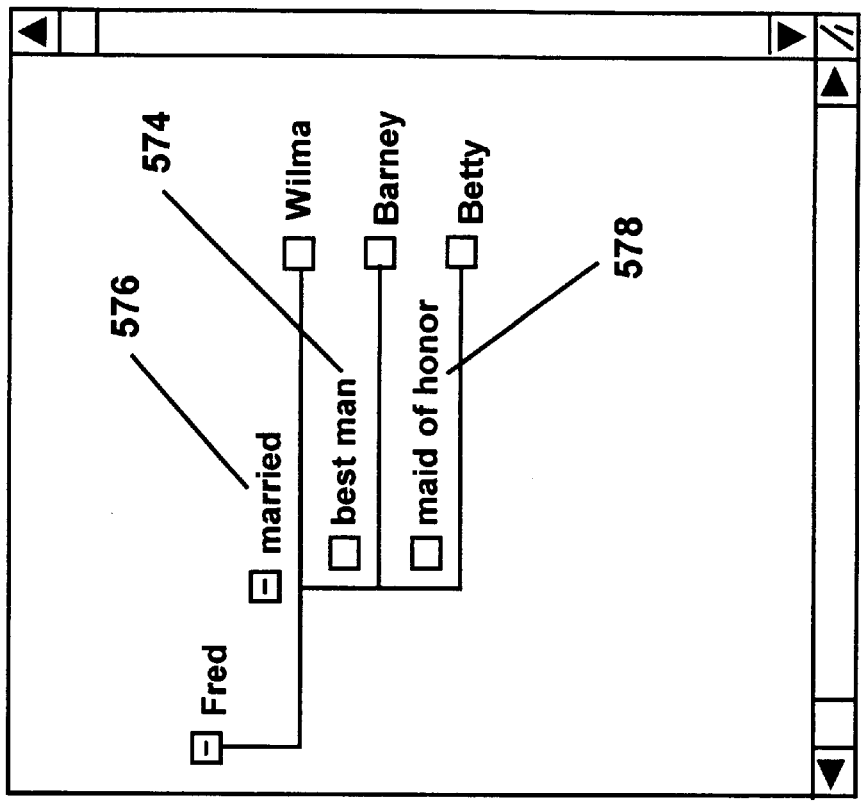
Figure 5H:
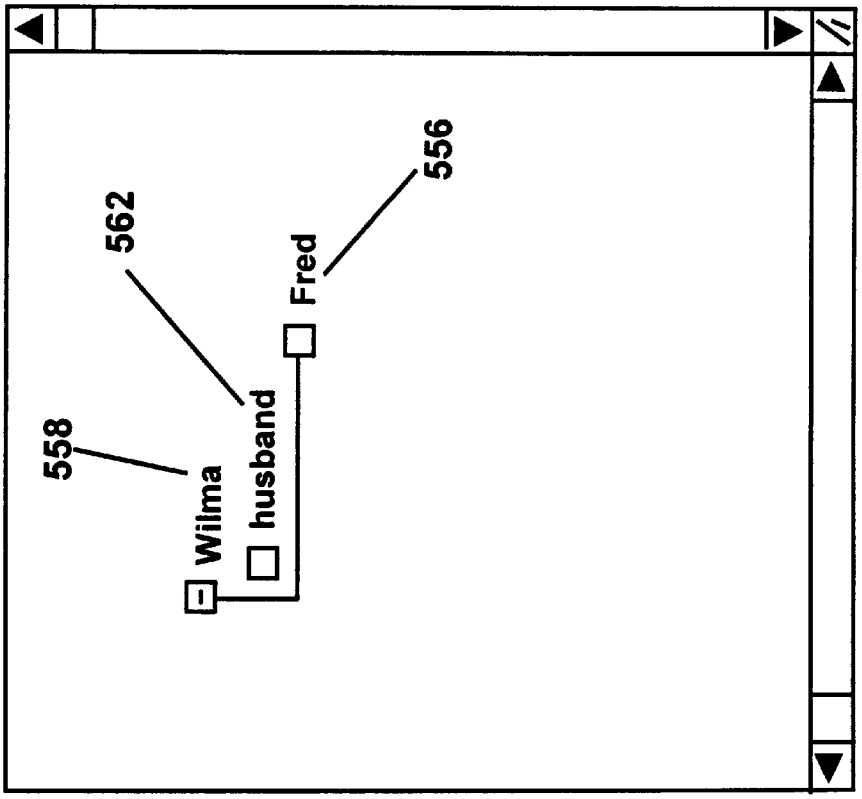

FIGS. 5F–5M show further advanced options for the display of semantic networks. FIG. 5F shows the use of web 552 embedded within web 554. Except for system limitations, the software does not limit the nesting of further levels of embedded webs. FIGS. 5G–5H show the use of "smart arcs" with the spousal relationship between Fred and Wilma. In FIG. 5G, where Fred object 556 is the top-level object, the spouse arc to Wilma object 558 is shown as wife arc 560. However, where the relationship is changed in FIG. 5H and Wilma object 558 is the top-level object, the spouse arc to Fred object 556 is shown as husband arc 562. Smart arcs may be implemented that rely on the use of other conceptual pairs, including mother-daughter, father-son, employer-employee, and others.

Figure 5K:
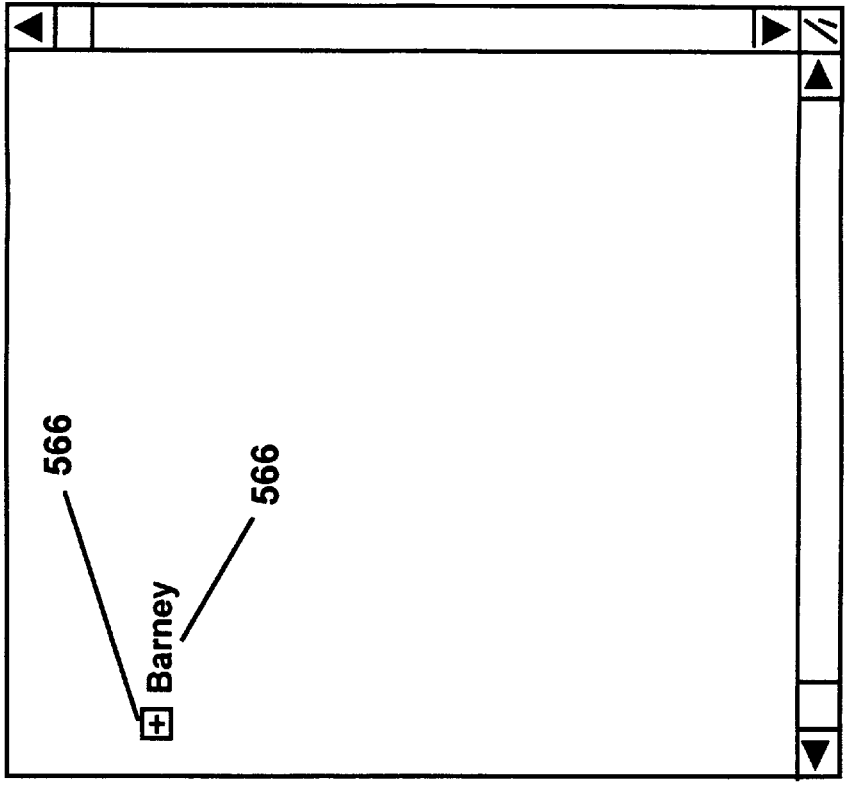
Figure 5J:
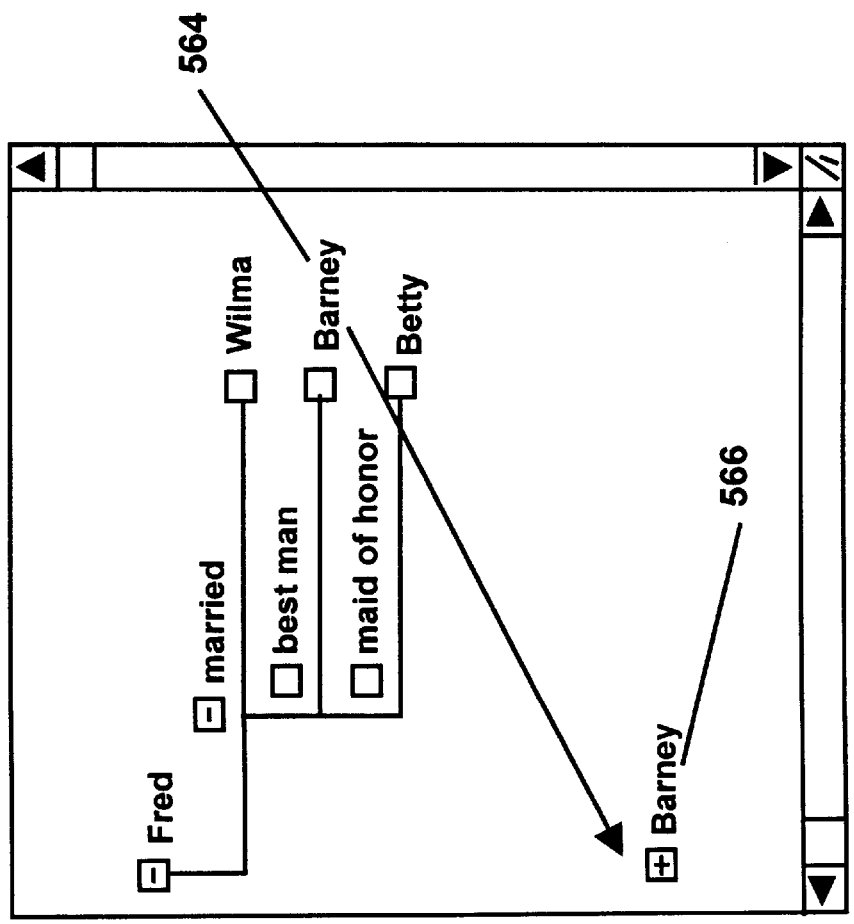
Figure 5M:
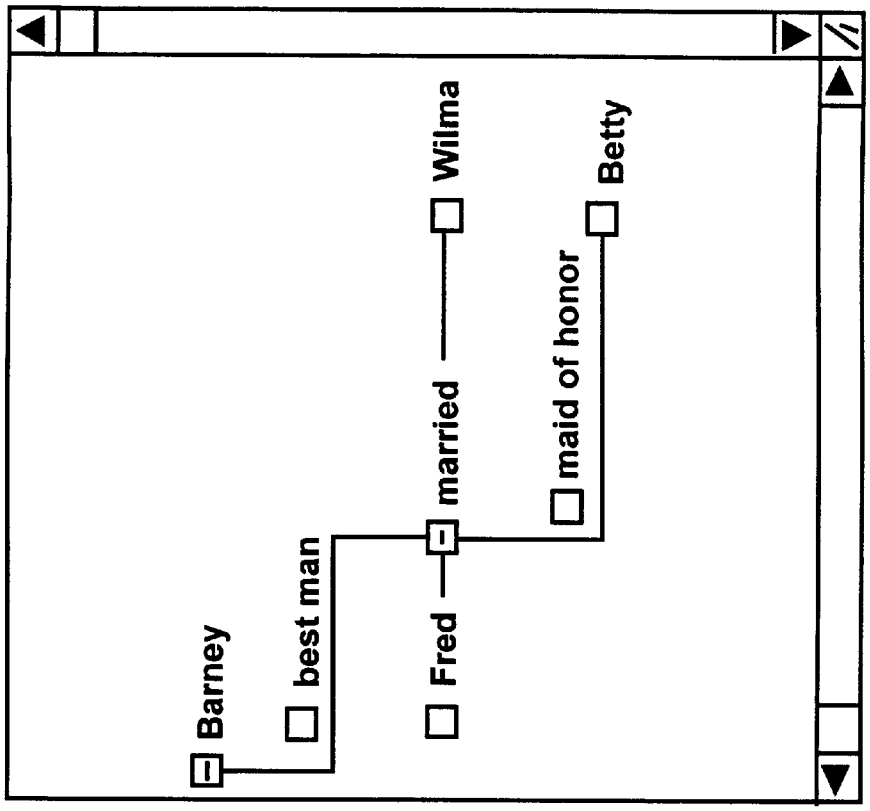
Figure 5L:
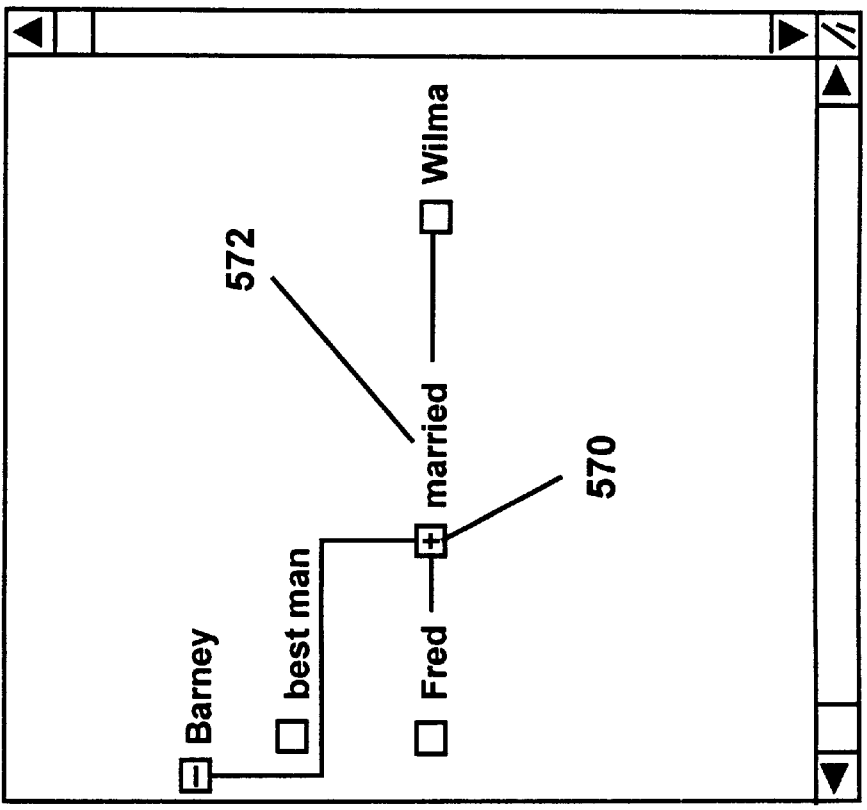

FIGS. 5I–5M illustrate the ability of the user interface to focus on different objects of interest. FIG. 5I shows an illustrative semantic network in which the marriage of Fred and Wilma is shown, at which Barney was the best man and Betty was the maid of honor. FIG. 5J shows that, to focus on Barney object 564, the user may drag-and-drop the Barney object to a new location to create a second copy of this object, Barney object 566. (Alternate methods of copying Barney object 564 may be used, such as the three-step procedure of select, copy, and paste.) FIG. 5K shows the resulting display where button 568 of Barney object 566 is a plus sign, which indicates that it has one or more descendants. By clicking on button 568, one arrives at the display shown in FIG. 5L, which is a traversal of the semantic network shown in FIG. 5I from the perspective of Barney. From Barney's perspective, he was the best man at the marriage of Fred and Wilma. By clicking on button 570 associated with married arc 572, the software displays the complete semantic network from the perspective of Barney, as shown in FIG. 5M.

Figure 6A:
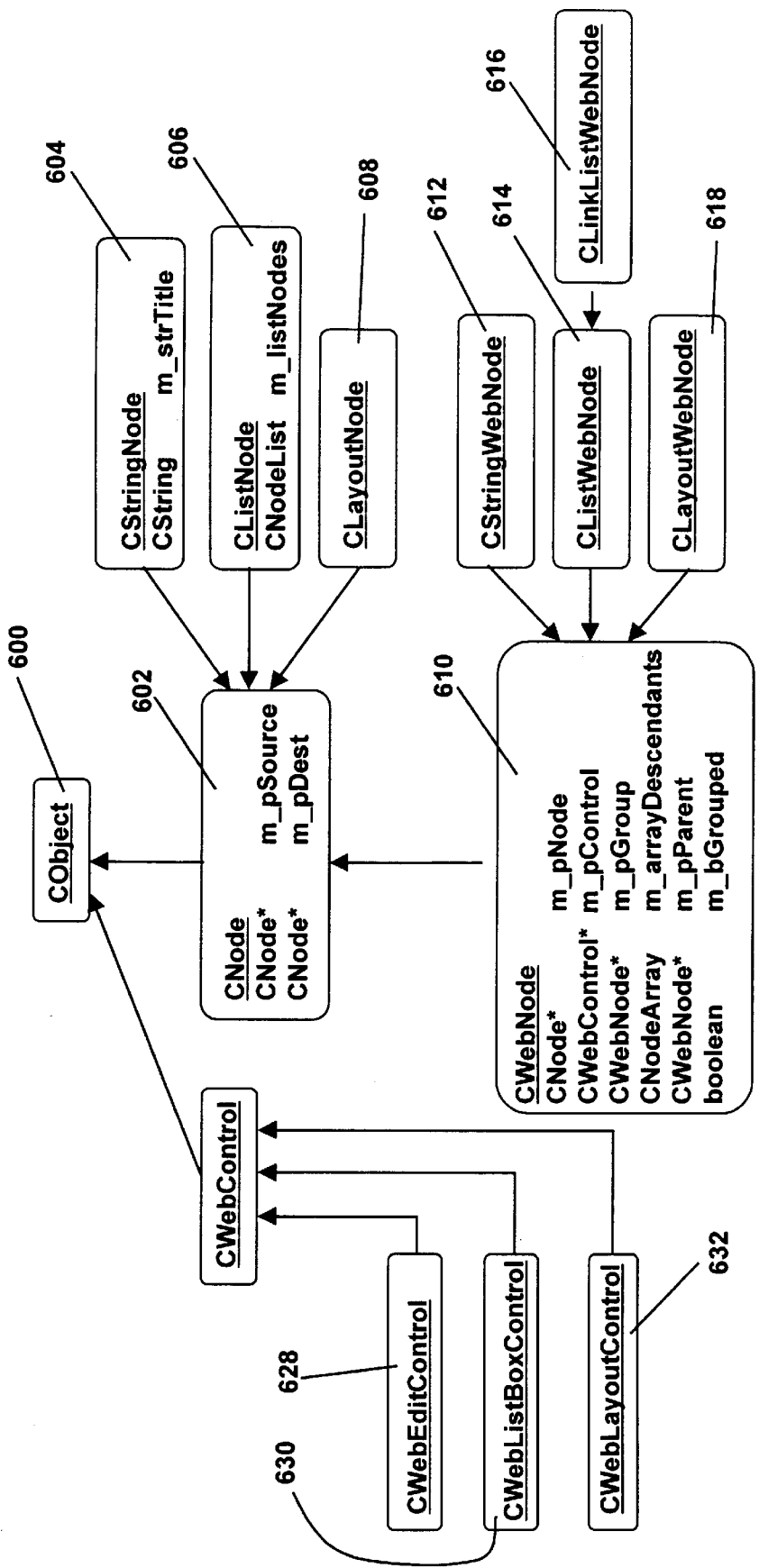
FIGS. 6A–6H show data structures used in the software.

FIGS. 6A–6H show data structures used in one representation of the software. FIG. 6A shows a Booch diagram of the object class hierarchy, in which "Hungarian notation" is used to label each class name and member variable name. (In "Hungarian Notation", class names are prefixed with "C", while names of member variables of a class are prefixed with "m__" followed by a tag indicating their data type, e.g., "n" for number, "p" for pointer, "str" for string, "array" for array, "b" for boolean, etc.) This object class hierarchy may be implemented, for example, in the C++ programming language. Equivalent data structures could be implemented in other object-oriented programming languages or even in non-object-oriented programming languages. The key feature of the data structure is that a first data structure, such as CNode 602 in FIG. 6A, contains the underlying structure of a semantic network, while a second data structure, such as CWebNode 610 in FIG. 6A, contains information for rendering the semantic network, or drawing it on the display.

CObject 600 is the top-level object class. CNode 602 is a subclass of CObject 600 and contains underlying data pertaining to an object or arc, together with the associated data for that object or arc in a semantic network. CNode 602 includes two attributes: (i) m__pSource, a pointer to the source of this CNode; and (ii) m__pDest, a pointer to the destination of this CNode. CNode 602 has several subclasses, including CStringNode 604, CListNode 606, and CLayoutNode 608. The subclasses are used for different elements in a semantic network. CStringNode 604 is associated with text-labeled CNodes and text-labeled arcs in a semantic network. CStringNode 604 adds one attribute, a string identified as m__strTitle, which stores the text value of this CNode. CListNode 606 is associated with displaying grouped data elements, such as the list boxes and tables shown in FIGS. 5B through 5E. CListNode 606 adds one attribute, a pointer to a list of CNodes identified as m__listNodes, which stores the list of items included in a list box. The final illustrative subclass of CNode 602 is CLayoutNode 608, which would be associated with and which would store a web embedded within a web, such as web 552 shown in FIG. 5F. It is contemplated that other CNode subclasses could be used in the software, such as picture CNodes, audio CNodes, file CNodes, and World Wide Web hyperlink CNodes.

CWebNode 610 is also a subclass of CNode 602. A CWebNode may be understood as a CNode on display, as it contains information concerning the rendering, or drawing on the display, of the CNode with which it is associated. CWebNode 610 adds six attributes to the two elements already in the CNode 602 class, including: (i) m__pNode, a pointer to the CNode associated with this CWebNode; (ii) m__pControl, a pointer to a CWebControl 626 responsible for rendering, drawing, and altering the data in the associated CNode; (iii) m__pGroup, a pointer to a CWebNode for which this CWebNode is one of one or more elements in the group; (iv) m__arrayDescendants, an array of CWebNodes, which are the descendants of this CWebNode; (v) m__pParent, a pointer to the parent of this CWebNode; and (vi) m__bGrouped, a boolean attribute used with decision logic for rendering a web. There are several subclasses of CWebNode 610, which are used for the different types of nodes that are displayed as part of a web. Illustrative subclasses of CWebNode 610 include CStringWebNode 612, CListWebNode 614, CLinkListWebNode 616, and CLayoutWebNode 618, which are associated with strings, list boxes, and embedded webs. Other CWebNode subclasses may be used in the software as needed.

CWebControl 626 is a subclass of CObject 600. CWebControl 626 is an abstract class responsible for rendering, displaying, and altering CNode data. It includes several subclasses for rendering, displaying, and altering specific types of data, including CWebEditControl 628 for string data, CWebUistBoxControl 630 for list box data, and CWebLayoutControl 632 for embedded webs. Other CWebControl subclasses may be used in the software as needed. As part of the contents of CWebControl 626, it is anticipated that attributes for drawing or rendering the associated CNode data will be included. For example, CWebEditControl 628 and CWebListBoxControl 630 may include color, font size, and font type for text data. For other CWebNode classes, there may be a volume control for an audio object or a scale control for a picture object. Other suitable attributes may be included.

Figure 6B:
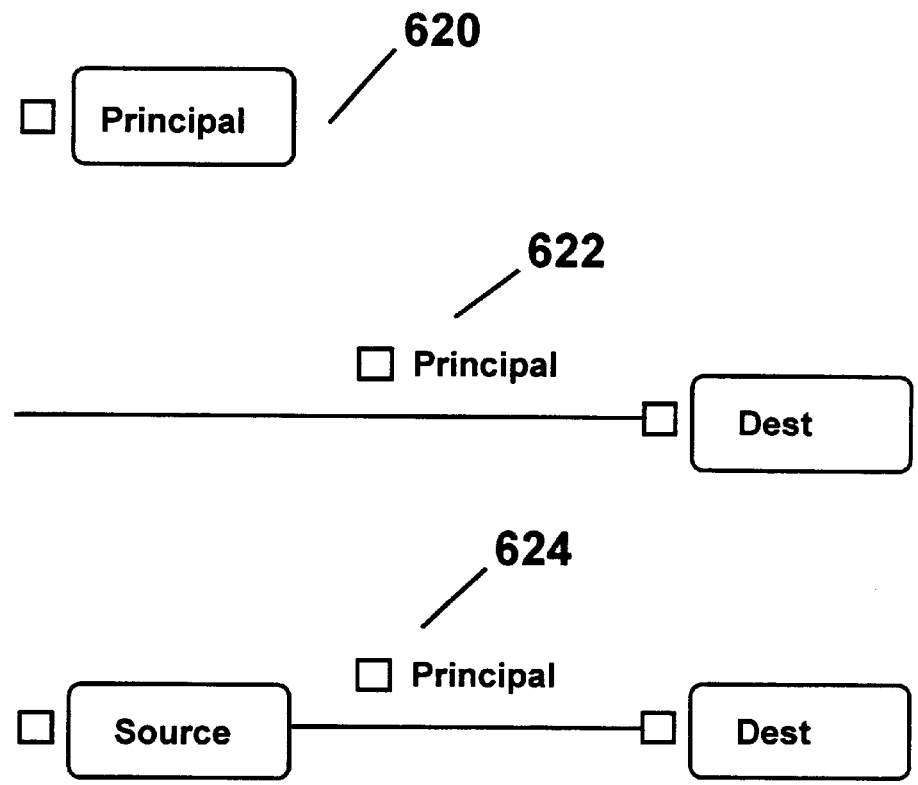
Figure 6C:
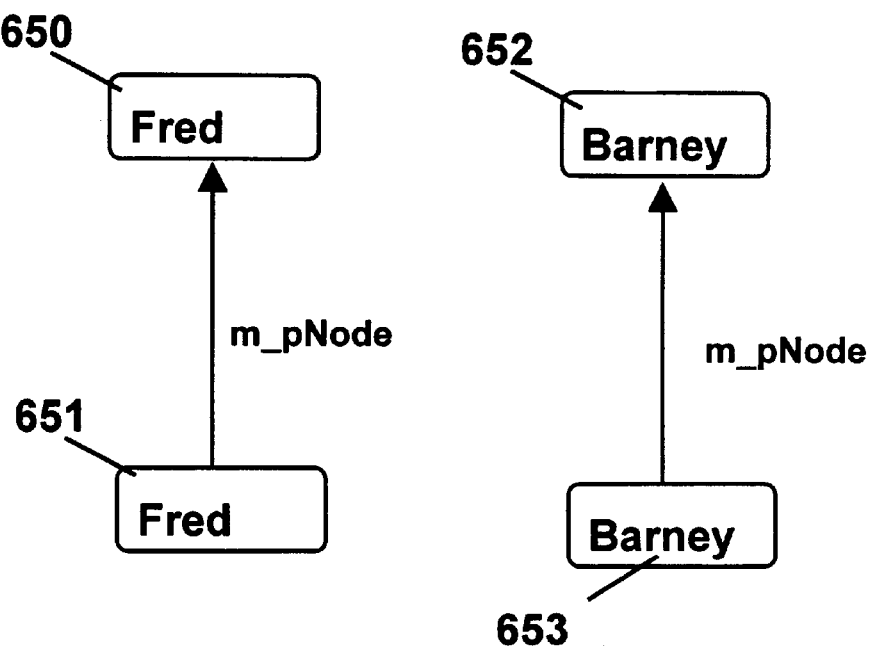
Figure 6D:
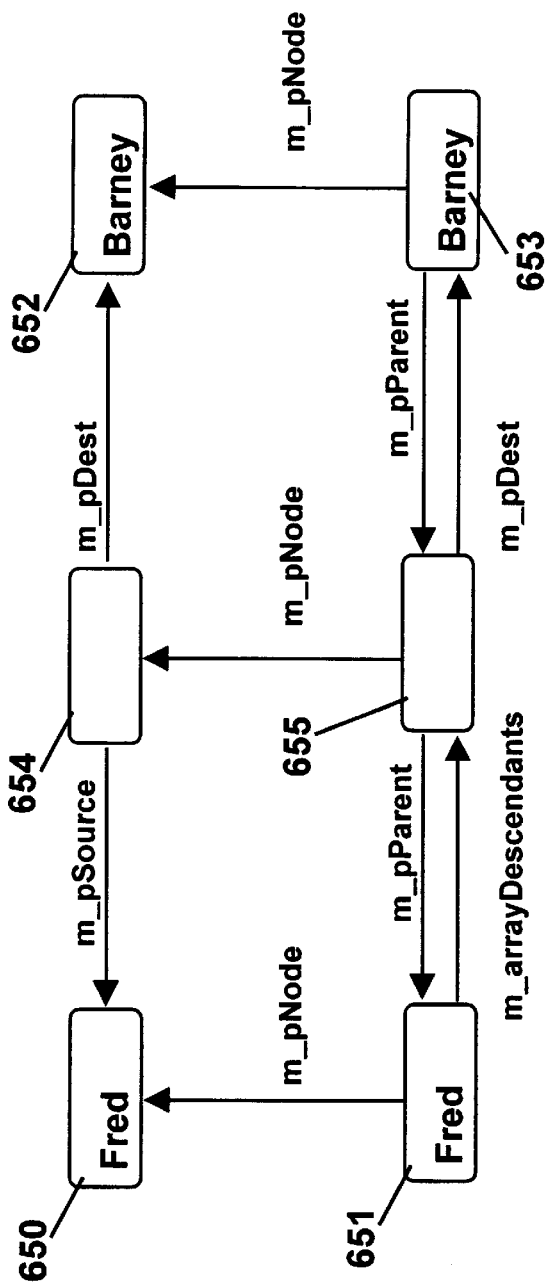
Figure 6E:
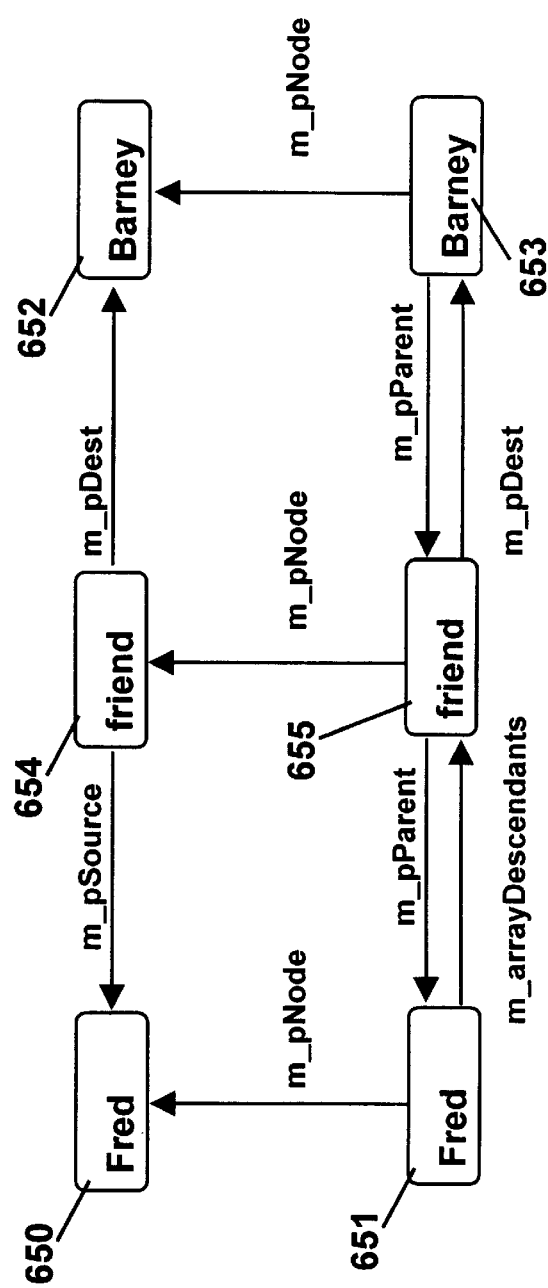
Figure 6F:
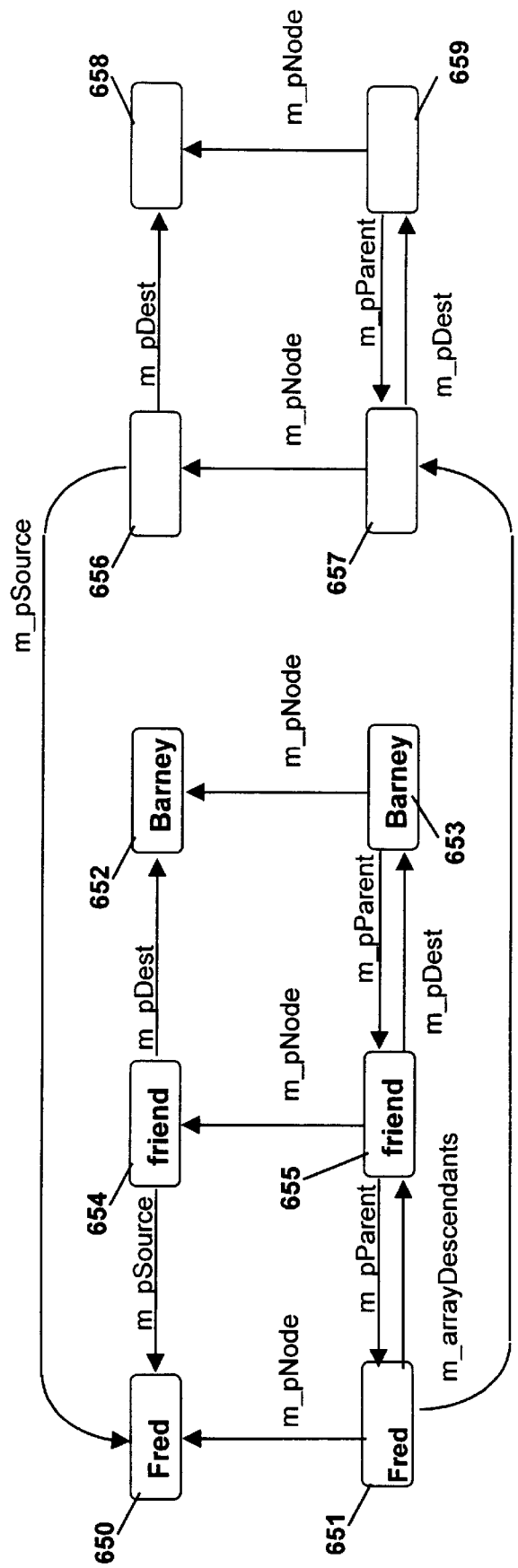
Figure 6G:
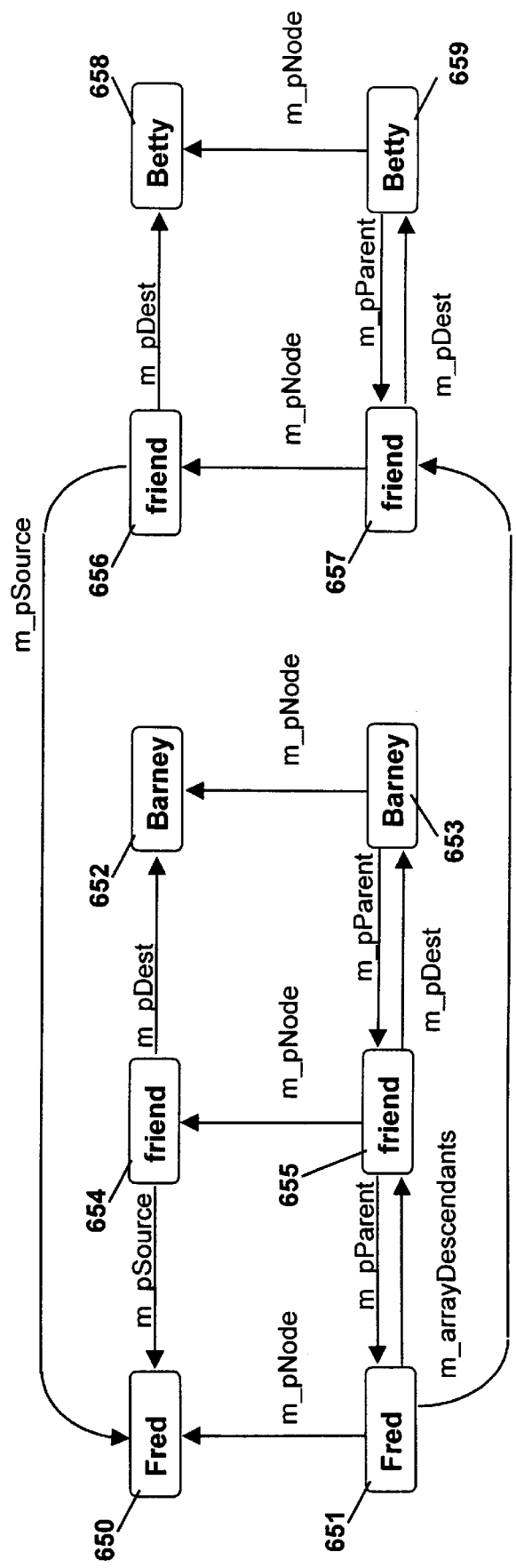
Figure 6H:
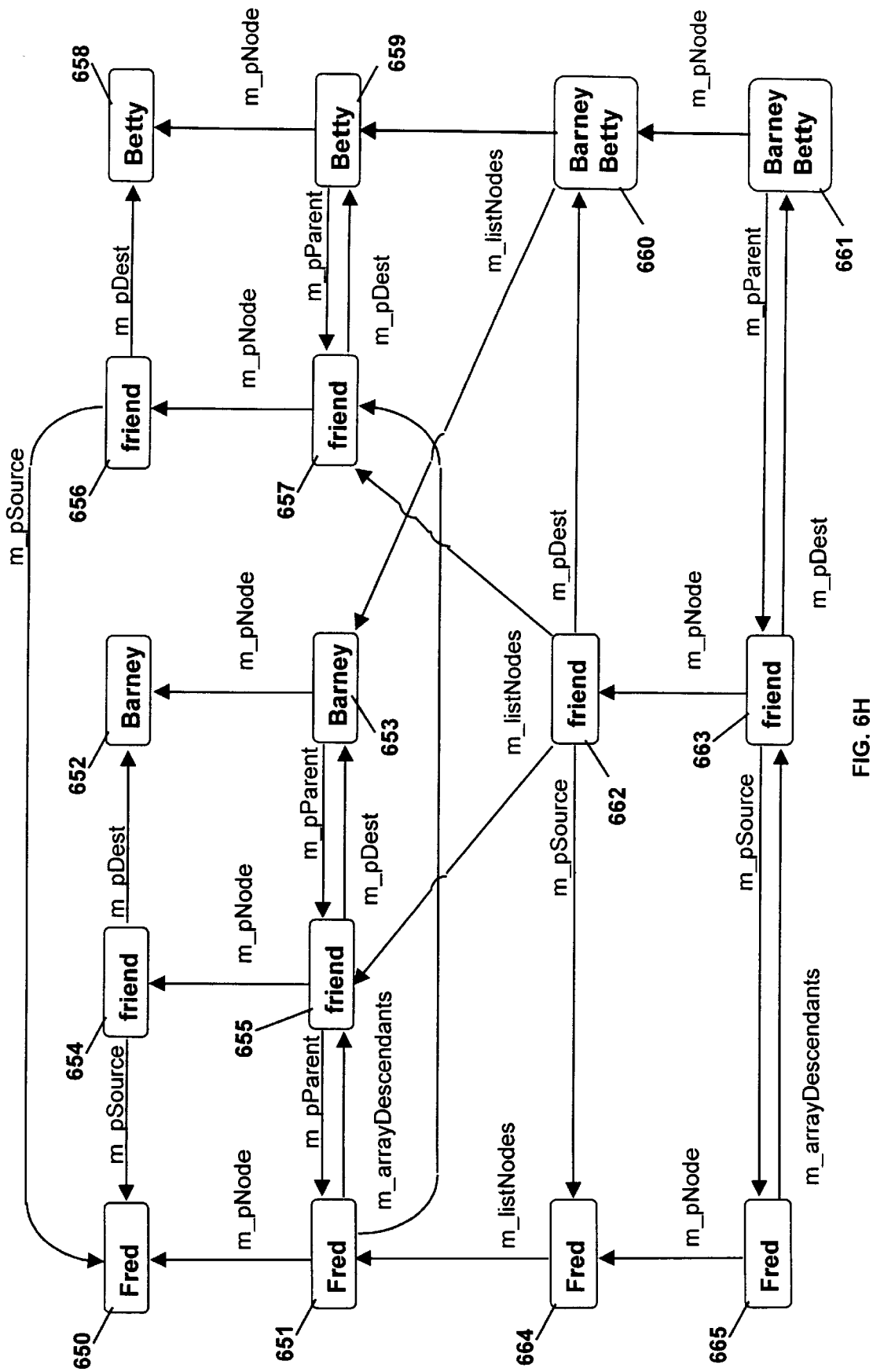

FIG. 6B shows three standard renderings of a CWebNode. A CWebNode with no source (i.e., m__psource=NULL) and no destination (i.e., m__pDest=NULL) would be displayed as CWebNode 620. A CWebNode with no source (i.e., m__pSource=NULL), and having a destination (i.e., m__pDest=Dest) would be displayed as CWebNode 622. A CWebNode having both source and destination pointers (i.e., m__pSource=Source and m__pDest=Dest) would be displayed as CWebNode 624. All of the displays are generated from these three standard CWebNode renderings. In the drawings, for example, Fred object 410 and Barney object 414 are renderings of type CWebNode 620; friend arc 422 and friend group arc 434 are renderings of type CWebNode 622; and married arc 572 is a rendering of type CWebNode 624.

The utility of the data structure of FIG. 6A is illustrated by showing how it is created for the input of FIGS. 4A–4H. The drawings in FIGS. 6C–6H show the incremental creation of the data structure for the semantic network shown in FIGS. 4C–4H. In this example, there is a one-to-one correspondence between CNodes and CWebNodes; in other words, for each CNode created to hold underlying data for objects and arcs, there is a corresponding CWebNode created to hold drawing information. In general, though, there will often be many CWebNodes pointing to the same CNode. For clarity, CNodes have even reference numerals and corresponding CWebNodes have odd reference numerals in the drawings in FIGS. 6C–6H. In addition, pointers with NULL values are not displayed; pointers are labeled from their source ends; and the values of m__strTitle and m__pGroup are not included.

When Fred object 410 is entered, two objects of class CObject are created, including Fred CStringNode 650 and Fred CStrngWebNode 651. In Fred CStringNode 650, m_strTitle is set to "Fred", and the m_pSource and m_pDest pointers are both set to NULL. In Fred CStringWebNode 651, the m_pSource, m_pDest, and m_pParent pointers are all set to NULL; the m_pNode pointer is set to point to Fred CStringNode 650; the m_pControl pointer is set to point to an object of the class CWebEditControl; the m_pGroup pointer may be set to NULL or updated as described later in this disclosure; and the m_arrayDescendants array is left empty. When Barney object 414 is added, Barney CStringNode 652 and Barney CStringWebNode 653 are created, which are similar in form and content to, respectively, Fred CStringNode 650 and Fred CStringWebNode 651.

When friend arc 422 is added, two new objects of class CObject are created and Fred CStringWebNode 651 and Barney CStringWebNode 653 are updated. The objects created are friend CStringNode 654 and friend CStringWebNode 655. In friend CStringNode 654, m_strTitle is set to "friend"; the m_pSource pointer is set to point to Fred CStringNode 650; and the m_pDest pointer is set to point to Barney CStringNode 652. The m_pSource and m_pDest pointers in friend CStringNode 654 are set in this way to reflect the status of friend as an arc in the semantic network. In friend CStringWebNode 655, the m_pSource is set to NULL (so that the CWebNode will be displayed in the rendering style of CWebNode 622); the m_pDest pointer is set to point to Barney CStringWebNode 653; the m_pNode pointer is set to point to friend CStringNode 654; the m_pControl pointer is set to point to an object of the class CWebEditControl; the m_pGroup pointer may be set to NULL or updated as described later in this disclosure; the m_arrayDescendants array is left empty; and the m_pParent pointer is set to point to Fred CStringWebNode 651.

When friend arc 422 is added, Fred CStringNode 650 and Barney CStringNode 652 are not changed, as both are still objects in the semantic network. Fred CStringWebNode 651 and Barney CStringWebNode 653, however, are updated to reflect the addition of friend arc 422, so that the semantic network may be properly rendered or displayed. Two updates (other than group updates, which are discussed in a later portion of the disclosure) are needed: (i) in Fred CStringWebNode 651, the m_arrayDescendants array is updated to include a pointer to friend CStringWebNode 655; and (ii) in Barney CStringWebNode 653, the m_pParent pointer is set to point to friend CStringWebNode 655. At this point, the data structure includes three objects of class CStringNode 604 and three objects of class CStringWebNode 612. The three CStringNodes contain the underlying structure of the semantic network, while the three CStringWebNodes contain information to draw the web. Fred CStringWebNode 651 and Barney CStringWebNode 653 are of the form of CWebNode 620, and friend CStringWebNode 655 is of the form of CWebNode 622.

When friend arc 428 and Betty object 430 are added, several new objects are created and several updates are made in the existing data structures. Two new objects are created for the second friend arc, which are similar in form and content to the two objects created for the first friend arc. Two new objects are created for the Betty object, which are similar in form and content to the objects created for the Barney object. These four objects are friend CStringNode 656, friend CStringWebNode 657, Betty CStringNode 658, and Betty CStringWebNode 659. The m_arrayDescendants array in Fred CStrngWebNode 651 is updated to include a pointer to the second mend arc (friend CStringWebNode 657) in addition to the existing pointer to the first friend arc (friend CStringWebNode 655). At this point, the data structure is complete for displaying a basic semantic network, such as the one shown in FIG. 4G or 5A. To display more complex forms of a semantic network, such as the ones shown in FIGS. 5B–5E, group objects are created. These group objects may be created either (i) at the time arcs and objects are added to a semantic network or (ii) at the time the user requests the display of a more complex form of the semantic network.

Several new objects are created and several updates are made in the existing data structures to represent the friends group of the present example. Six objects are created, including two objects associated with friends group list box 432, two objects associated with friends group arc 434, and two objects associated with Fred object 436. For friends group list box 432, CListNode 660 and CUstWebNode 661 are created. For friends group arc 434, CListNode 662 and CLinkListWebNode 663 are created. For Fred object 436, CListNode 664 and CListWebNode 665 are created. The attributes of the six new objects are set as follows:

(1) In friends group list box CListNode 660, m_pSource and m_pDest point to NULL, and m_listNodes is a linked list of Barney CStringWebNode 653 and Betty CStringWebNode 659.

(2) In friends group list box CListWebNode 661, m_pSource, m_pDest, and m_pGroup point to NULL; m_pNode points to friends group list box CListNode 660; m_pControl points to an object of CWebListBoxControl 630; m_arrayDescendants is empty; and m_pParent points to friends group arc CLinkListWebNode 663.

(3) In friends group arc CListNode 662, m_pSource points to the Fred CListNode 664; m_pDest points to friends group list box CListNode 660; and m_listNodes is a linked list of the friend CStringWebNode 655 and friend CStringWebNode 657.

(4) In friends group arc CLinkListWebNode 663, m_pSource and m_pGroup point to NULL; m_pDest points to friends group list box CUstWebNode 661; m_pNode points to friends group arc CListNode 662; m_pControl points to an object of type CWebEditControl 628; m_arrayDescendants is empty; and m_pParent points to Fred CListWebNode 665.

(5) In Fred CListNode 664, m_pSource and m_pDest point to NULL and m_listNodes is a linked list consisting of Fred CStringWebNode 651.

(6) In Fred CListWebNode 665, m_pSource, m_pDest, m_pGroup$_1$ and m_pParent point to NULL; m_pNode points to Fred CListNode 664; m_pControl points to an object of type CWebEditControl 628; and m_arrayDescendants is an array consisting of a pointer to friends group arc CLinkListWebNode 663.

In addition to adding the above objects, the m_pGroup attributes of the original CWebNodes are updated, so that the semantic network includes information identifying the friends group. Five updates are needed: (i) in the original Fred CStringWebNode 651, m_pGroup is set to point to the new Fred CListWebNode 665; (ii) in the first friend CStringWebNode 655, m_pGroup is set to point to the friend group arc CLinkListWebNode 663; (iii) in the second friend CStringWebNode 657, m_pGroup is set to point to the friend group arc CLinkListWebNode 663; (iv) in the Barney CStringWebNode 653, m_pGroup is set to point to the friends group list box CListWebNode 661; and (v) in the Betty CStringWebNode 659, m_pGroup is set to point to the friends group list box CListWebNode 661. By updating the original CWebNodes in this manner, the software is able to use the values of the m_pGroup attributes in the original CWebNodes (as rendered or displayed in FIG. 4G) to switch to the rendering or display of the network showing the friends group (as shown in FIG. 4H). Information in the m_pGroup attribute is also used to generate tables (such as table 538 shown in FIG. 5E).

In entering a semantic network, it is possible to set m_pGroup to NULL and avoid generating group CNode and group CWebNodes until they are needed. As illustrated in the above example, such information could be generated at the time a group display is requested. It is preferable, however, to generate group information incrementally while one builds a semantic network. This enables the user to request that information in the web be reorganized, regrouped, or presented in a different format with almost instantaneous results, as there is no need to generate significant new data structures or to perform prolonged search procedures.

An embodiment of the software that incrementally updates group information may be based on the addition of new nodes and new arcs. Each time a new node is created without a parent, group information may be updated by: (i) creating a CNode and a CWebNode for the new node; (ii) creating a CListNode and a CListWebNode for the new node; and (iii) setting m_pGroup in the new CWebNode to point to the new CListWebNode. Each time a new arc (or new descendant) is added, group information may be updated by: (i) creating a CNode and a CWebNode associated with the new arc; (ii) adding the new arc's CWebNode to m_arrayDescendants for the CWebNode from which the new arc emanated; (iii) searching m_pGroup of the new arc's m_pParent (hereinafter "the Parents Group" in this example) to determine whether the label of the new arc matches the label of any formerly-created descendant of the Parents Group; (iv) if there is a match with a previous descendant of the Parent's Group, (a) setting m_pGroup of the new arc equal to the matching CLinkListWebNode, and (b) setting m_pGroup of the destination of the new arc to point to the destination of the matching CLinkListWebNode; and (v) if there is no match, (a) creating a CListNode and a CLinkListWebNode as the group to which the new arc belongs, (b) creating a CListNode and a CListWebNode to hold the members of the group, (c) setting m_pDest in the new CLinkListWebNode to point to the new CListWebNode, (d) adding the new CLinkListWebNode as a descendant of the Parent's Group, and (e) invoking the procedure recursively on this new descendant. The recursion terminates when m_pParent has an m_pGroup set to NULL.

The utility of the data structure of FIG. 6A is further illustrated by showing how it is used for rendering the views shown in FIGS. 5A–5M. FIG. 5A shows a basic web view in which 46 CObjects are used, including 23 CNodes and 23 CWebNodes. FIG. 5B shows a first group display of the basic web view in FIG. 5A in which 38 additional CObjects are used, including 19 CListNodes and 19 objects of type CListWebNode or CLinkListWebNode. FIG. 5C shows a second group display of the basic web view of FIG. 5A in which 14 additional objects are used, including 7 CListNodes and 7 objects of type CListWebNode or CLinkListWebNode. To obtain the query results shown in FIG. 5D, the software displays only the items associated with the first m_listNodes in the CListNodes underlying department list box 548 and client list box 550. FIG. 5E is discussed in detail later in this specification with regard to the display of table data. In FIG. 5F, a CLayoutNode and a CLayoutWebNode would be associated with embedded web 552. For FIGS. 5G–5H, the software includes a method to display wife arc 560 or husband arc 562 based on the orientation of Wilma node 558 and Fred node 556. To generate the Barney-based web shown in FIGS. 5I–5M, the software creates a new CWebNode associated with Barney object 566 when that object is created as shown in FIG. 5J. A new CWebNode structure is created for that object based on the structure stored in the CNodes associated with the original web shown in FIG. 5I. Thus, the CNode for best man arc 574 contains the link between married and Barney; the CNode for married arc 576 contains the link between Fred and Wilma; and the CNode for maid of honor arc 578 contains the link between married and Betty. This information is replicated in the new CWebNode-structure.

Figure 7:
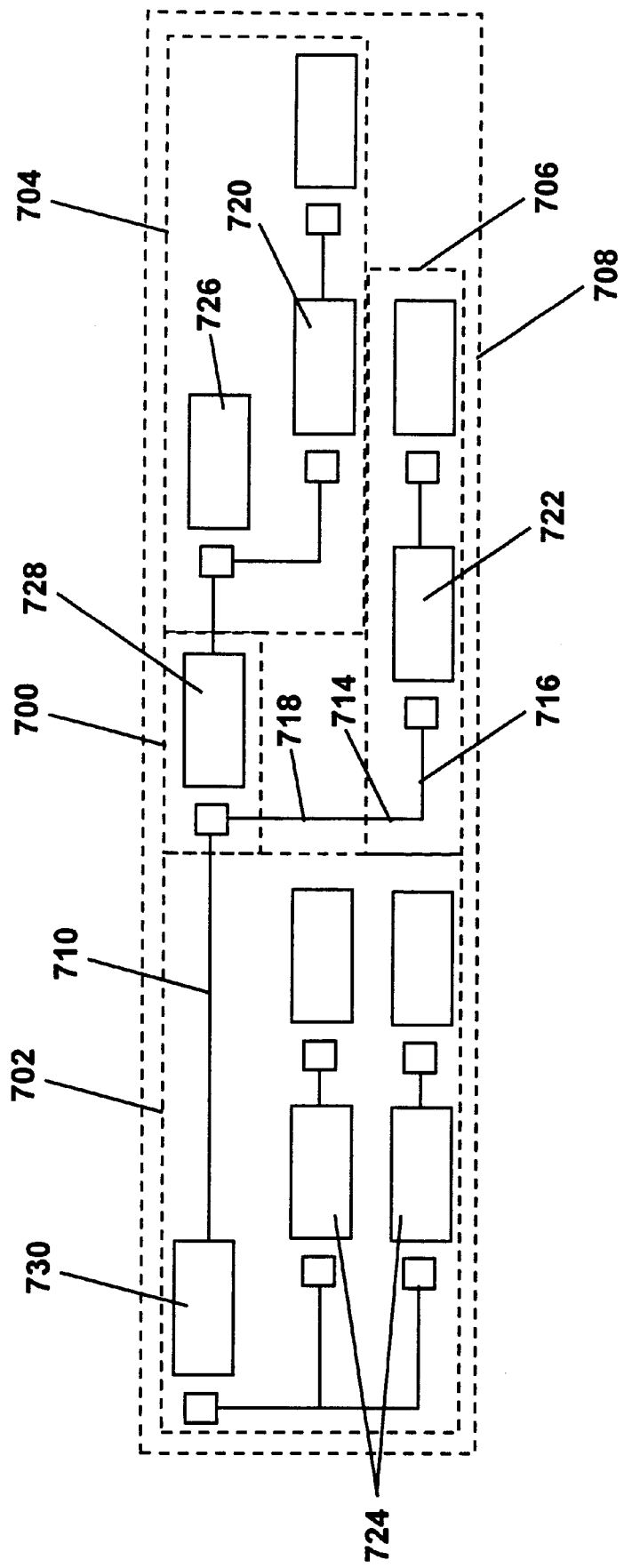
FIG. 7 shows structures used in rendering or displaying a web.

To further illustrate the utility of the data structure, FIG. 7 shows structures used in rendering or displaying a web. In the preferred embodiment, several C++ methods, which operate on objects of class CWebNode, are used to render or display the web. Alternative methods, functions, or procedures may be used to render or display a web using the disclosed or equivalent data structures. FIG. 7 shows four rectangles used in rendering a web, including principal rectangle 700, source rectangle 702, destination rectangle 704, and descendant rectangle 706. The rectangular union of these four rectangles (i.e., the smallest rectangle enclosing all of them) is rectangle 708, which defines the extent of the web. The four rectangles are defined with respect to the CWebNode enclosed by principal rectangle 700. Thus, source rectangle 702 includes the principal CWebNode's m_pSource and related CWebNodes; destination rectangle 704 includes the principal CWebNode's m_pDest and related CWebNodes; and descendant rectangle 706 includes the CWebNodes comprising m_arrayDescendants in the principal CWebNode and their related CWebNodes.

The top-level method is the general drawing method, CWebNode::Draw, which draws the CWebNode on which the method is invoked (including all related CWebNodes). A parameter, rcBounds, identifies the window space allotted to draw the web. In general, this parameter ensures that the web is properly drawn without overlapping itself or extending beyond the region on the display allocated for it. The first and only step of the general drawing method is to call an extended drawing method identical to CWebNode::Draw with the addition in the extended drawing method of a parameter nWebDrawType, which identifies whether the CWebNode is a principal, source, destination, or descendant. The extended drawing method includes five primary steps. First, the extended drawing method calls itself on its source, which is the CWebNode pointed to by m_pSource. Second, the extended drawing method calls CWebNode::DrawControl, which draws the CWebNode. Third, the extended drawing method calls itself on its destination, which is the CWebNode pointed to by m_pDest. Fourth, the extended drawing method calls CWebNode:: DrawDescendants, which loops through the descendants of the CWebNode included in m_arrayDescendants and calls the extended drawing method on each one. The fifth and final primary step concerns drawing the buttons and lines to connect the buttons. Through recursive calls to these methods, the complete web is rendered or displayed on the desired output device. In making these calls, rcBounds is adjusted to reflect the smaller regions allotted to particular portions of the web. The rectangles are computed in such a way that: (i) descendants 720 of destination CWebNode 726 push down descendants 722 of principal CWebNode 728; and (ii) descendants 724 of source CWebNode 730 push principal CWebNode 728 out to the right.

The lines and buttons associated with the web are derived from standard rendering 620, 622, and 624. All three standard renderings draw the button associated with the CWebNode. In addition, standard renderings 622 and 624 draw the horizontal line representing the arc. The last step in the extended drawing method uses the parameter nWebDrawType to draw the connecting lines. If CWebNode is a source, it will draw line 710 from the right end of its control rectangle to the right edge of source rectangle 702. If CWebNode is a destination, it will draw line 712 from the left end of its button to the left edge of destination rectangle 704. If CWebNode is a descendant, it will draw line 714 along the left side of descendant rectangle 706 and line 716 from the left end of its button to the left edge of descendant rectangle 706. Every CWebNode, regardless of nWebDrawType, is responsible for drawing line 718 from the bottom of its button to the top of its descendant rectangle 706. The CWebNode::DrawControl method is the method where the data in the CNode underlying the CWebNode is actually drawn. This method invokes the drawing method implemented on the object, referenced by m_pControl. This will be an object of a data type derived from CWebControl 626. For example, CWebEditControl 628 renders string data, and CWebListBoxControl 630 renders list box data.

To render or display groups, the m_bGrouped variables in the CWebNodes are changed dynamically to indicate whether a web should be rendered (a) in its basic form or (b) with groups activated. For example, if m_bGrouped is false for friend CWebNode 663 from the example from FIG. 4H and 6H, the semantic network would be displayed in its basic form as shown in FIG. 4G. However, if m_bGrouped is true for this CWebNode, group CWebNodes 661, 663, and 665 would be used to display the semantic network with the friend group activated as shown in FIG. 4H. Other schemes for triggering the display of a basic web versus a web with groups activated may be used.

Methods may also be used to render or display tables. In one embodiment of the invention, three additional methods are used, including CWebNode::DrawChart, CWebNode::DrawChartTitles, and CWebNode::DrawChartEntries. The first method, CWebNode::DrawChart, takes a parameter indicating the rectangular boundary of the chart and passes a portion of this boundary to the second and third methods, which respectively (i) render the column titles of the chart and (ii) render the entries in each chart column. For the title of the first column, CWebNode::DrawChartTitles uses the m_pParent of the CWebNode for which the chart is being drawn. The remaining column titles are generated from the m_arrayDescendants list of the CWebNode for which the chart is being drawn, including the descendants of these descendants identified in a complete downward traversal of this portion of the web. CWebNode::DrawChartEntries renders the entries in each column, which are identified by the m_pDest of each CWebNode associated with each column title. This method identifies the largest block in each row so that entries in each column are appropriately spaced. In other words, if there are four entries in Column B for the first item in Column A, the second item in Column A will be spaced down accordingly.

The generation of table 538 in FIG. 5E provides an example of how this procedure works. As previously noted, table 538 is generated by performing the table function on button 536 associated with attorney list box 540 in FIG. 5C. Attorney list box 540 is represented by a CListWebNode, on which the CWebNode::DrawChart method is invoked. The title of the first column is the m_pParent of the CListWebNode for attorney list box 540. This parent is the CLinkListWebNode for attorney arc 542. Thus, the first column is titled "Attorney" in table 538. The entries for the first column are derived from the m_pDest of the CLinkListWebNode for attorney arc 542, which is the CListWebNode for attorney list box 540. Thus, the entries in the first column are "Flintstone, Fred", "Rubble, Barney", and "Rock, Susan". The title of the second and third columns of table 538 are derived from the m_arrayDescendants of the CListWebNode for attorney list box 540. These descendants are the CLinkListWebNodes for department arc 544 and client arc 546. The entries in the second and third columns of table 538 are derived from the m_pDest of each of these two descendants, which are, respectively, the CListWebNodes for department list box 548 and client list box 550. In this or an equivalent way, a table may be generated from group information.

In the preferred embodiment, several additional parameters are included in the various drawing methods. The first of these, dwAspect, is a doubleword that indicates whether a display is a full display, a thumbnail sketch, or text only. The second parameter is pDC, a pointer to a device context, a concept used in Microsoft's operating systems to point to a particular output device on which the web should be rendered, such as video monitor 102, a printer, or some other suitable device. The third parameter is rcInvalid, which indicates the smallest region within rcBounds that needs to be rendered. This parameter provides optimization by avoiding the need to rerender valid portions of a web. Other parameters may be used to enhance the drawing methods of any particular embodiment.

Figure 8A:
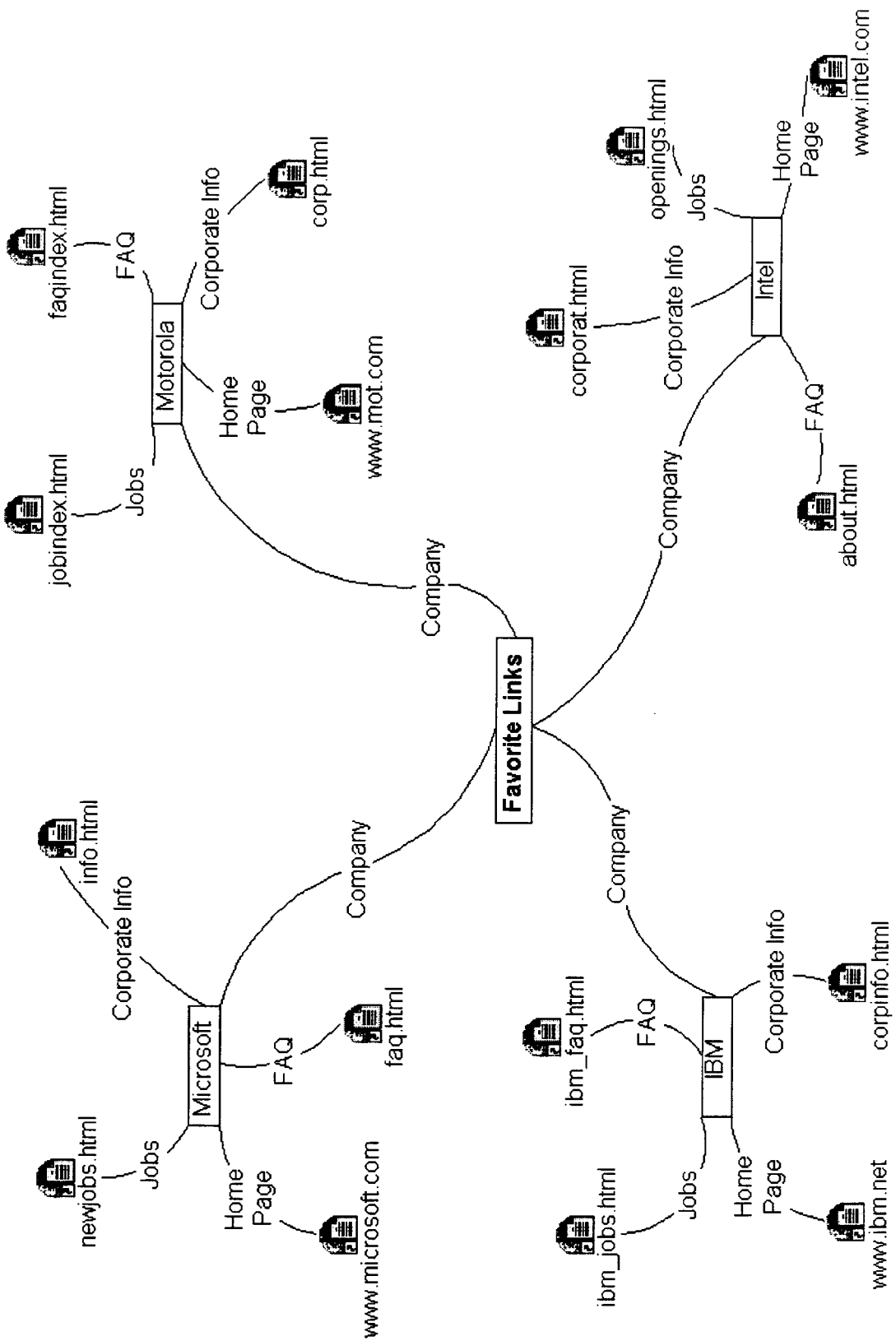

FIGS 8A–8B show an application of the invention for Internet Management. FIG. 8A shows a semantic network with hypothetical information for a users favorite World Wide Web hypertext links to Internet sites for Microsoft, IBM, Motorola, and Intel. The semantic network of FIG. 8A may be entered into the computer in a manner consistent with the disclosed software. The semantic network would include arcs for Home Page, FAQ, Corporate Info, Jobs and perhaps other items, and it would be similar in form, for example, to the semantic network shown in FIG. 3B. Other types of Internet sites and features may be enabled, consistent with the features of the software. From the basic semantic network entered into the computer, the software may arrange the information in useful ways, such as table 800 shown in FIG. 8B for a properly entered semantic network. The Internet Manager may be used to supplement or replace the favorites (or bookmark) feature of a web browser, such as Mosaic, Microsoft Explorer, Netscape Navigator, or another suitable browser. The Internet Manager may alternatively be embodied in separate application software, preferably with a means for linking Internet addresses to a suitable web browser. Operating system software may provide this linking function through cut-and-paste, drag-and-drop, object-linking, hypertext, or equivalent features. For example, double clicking in the CWebNode rendering an html page would launch the web browser to display that page. It is anticipated that the disclosed software could be used to automatically generate a semantic network representation of a World Wide Web site with objects representing World Wide Web pages and arcs representing hyperlinks labeled with associated text.

Figure 9B:
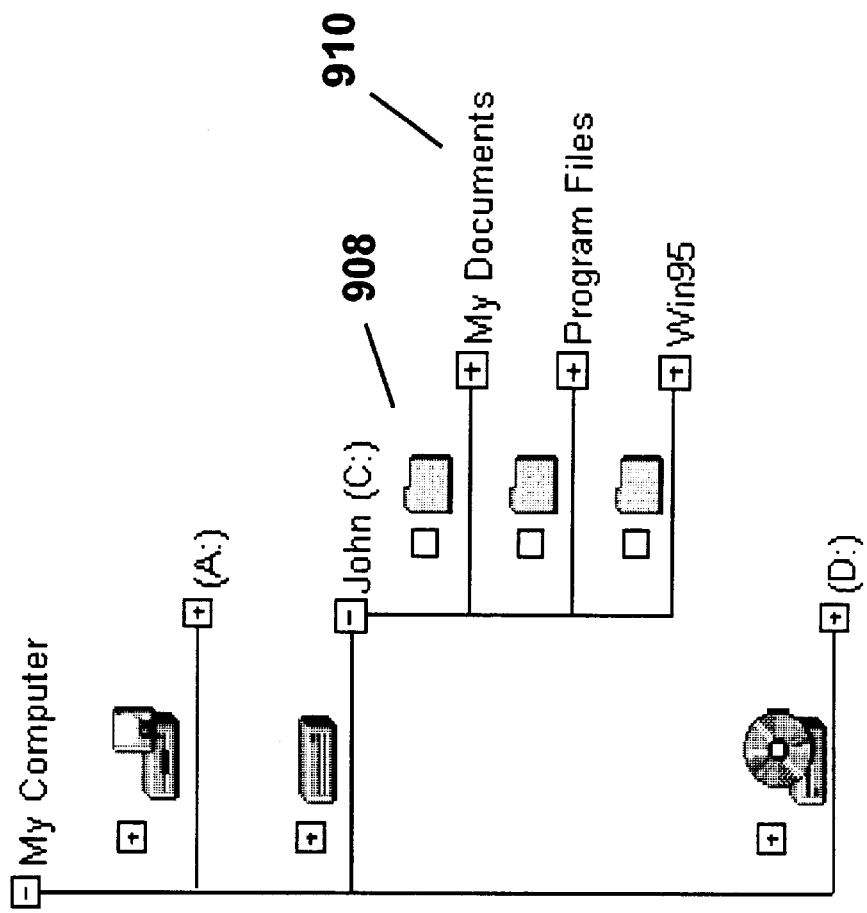
FIGS 9A–9H show an application of the invention for Resource Management.
Figure 9A:
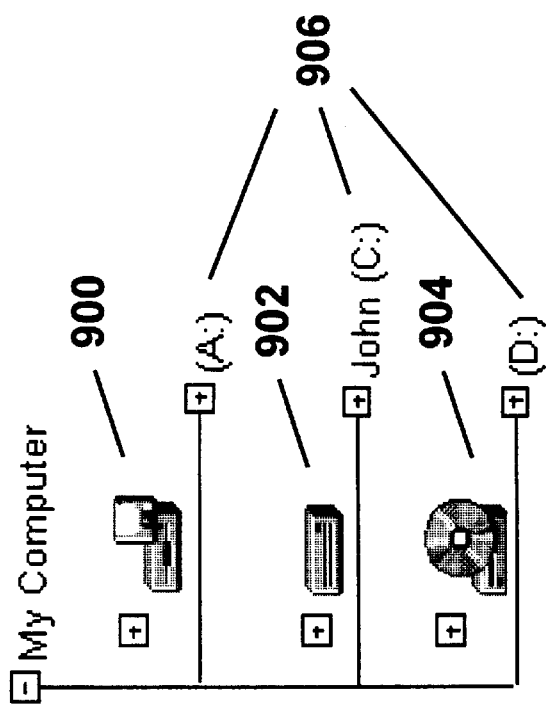
Figure 9D:
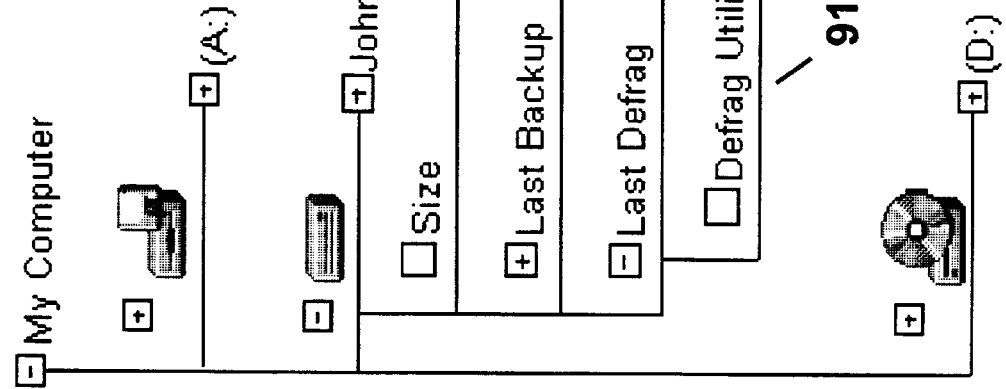
Figure 9C:
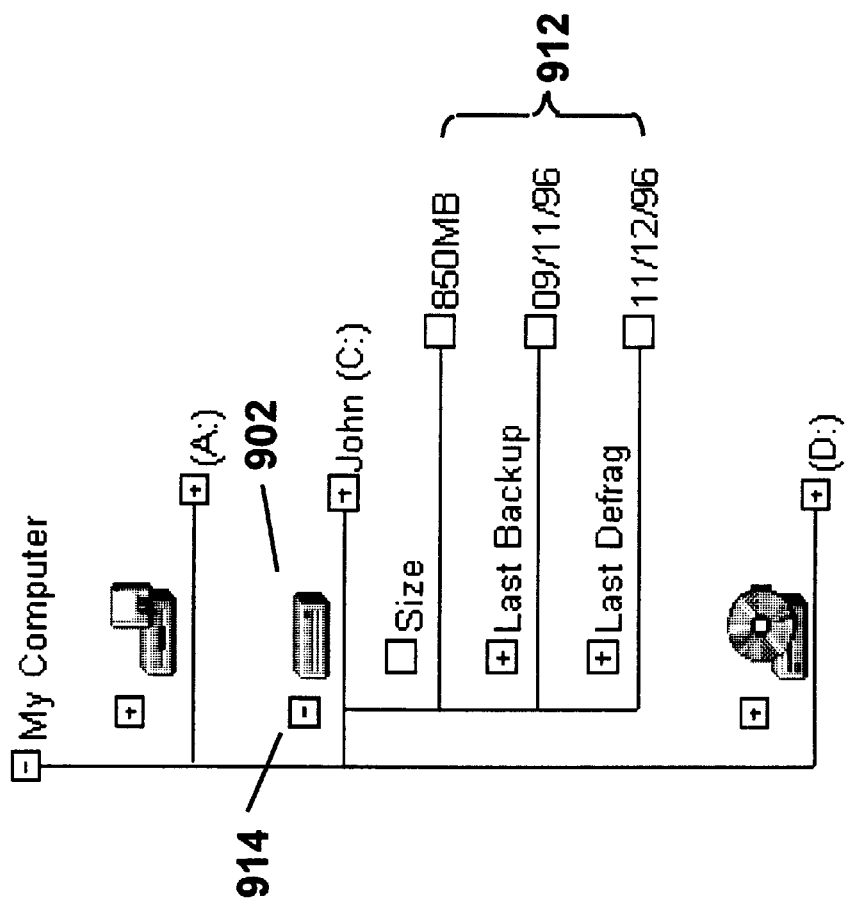

FIGS. 9A–9H show an application of the invention for Resource Management. FIG. 9A shows a view of a user's computer, which includes floppy drive 900, hard drive 902, and CD ROM 904. While FIG. 9A is in some respects similar to views used for resource management in existing windows-based operating systems, the use of labeled arcs in the present software adds new functionality. Thus, in FIG. 9A, each of devices 900, 902, and 904 includes name data at 906 in addition to device icons. FIG. 9B shows the separation of folder icons 908 from folder names 910. Because the software permits arcs to extend from arcs, even more information may be associated with a device, folder, or file. For example, FIG. 9C shows substantial additional information about hard disk 902 in arcs 912 emanating from arc button 914. FIG. 9D shows a further level of detail about hard disk 902 by adding link 916 to defrag utility 918, which is now easily accessible using the semantic network metaphor of the software.

Figure 9F:
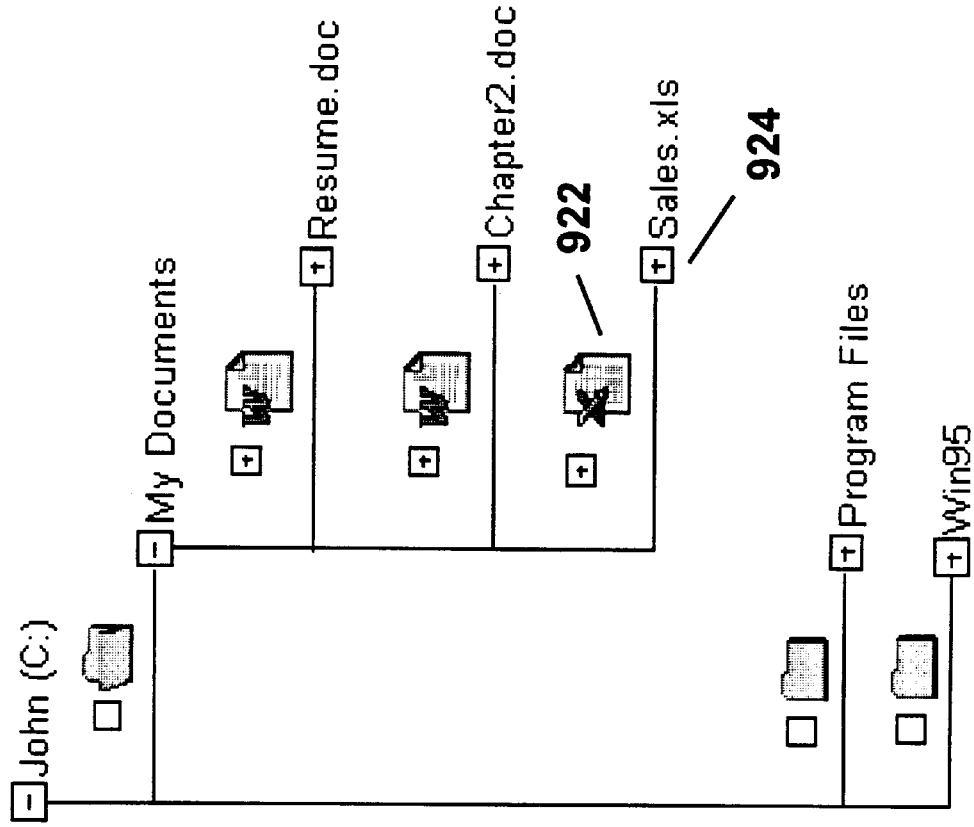
Figure 9E:
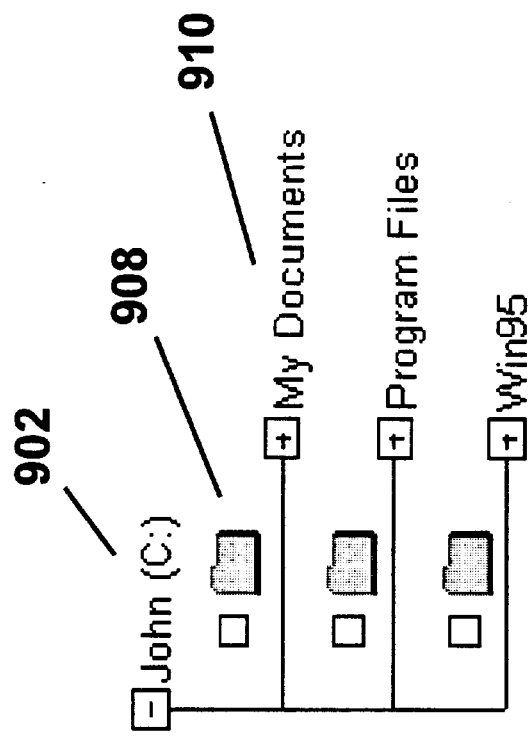
Figure 9G:
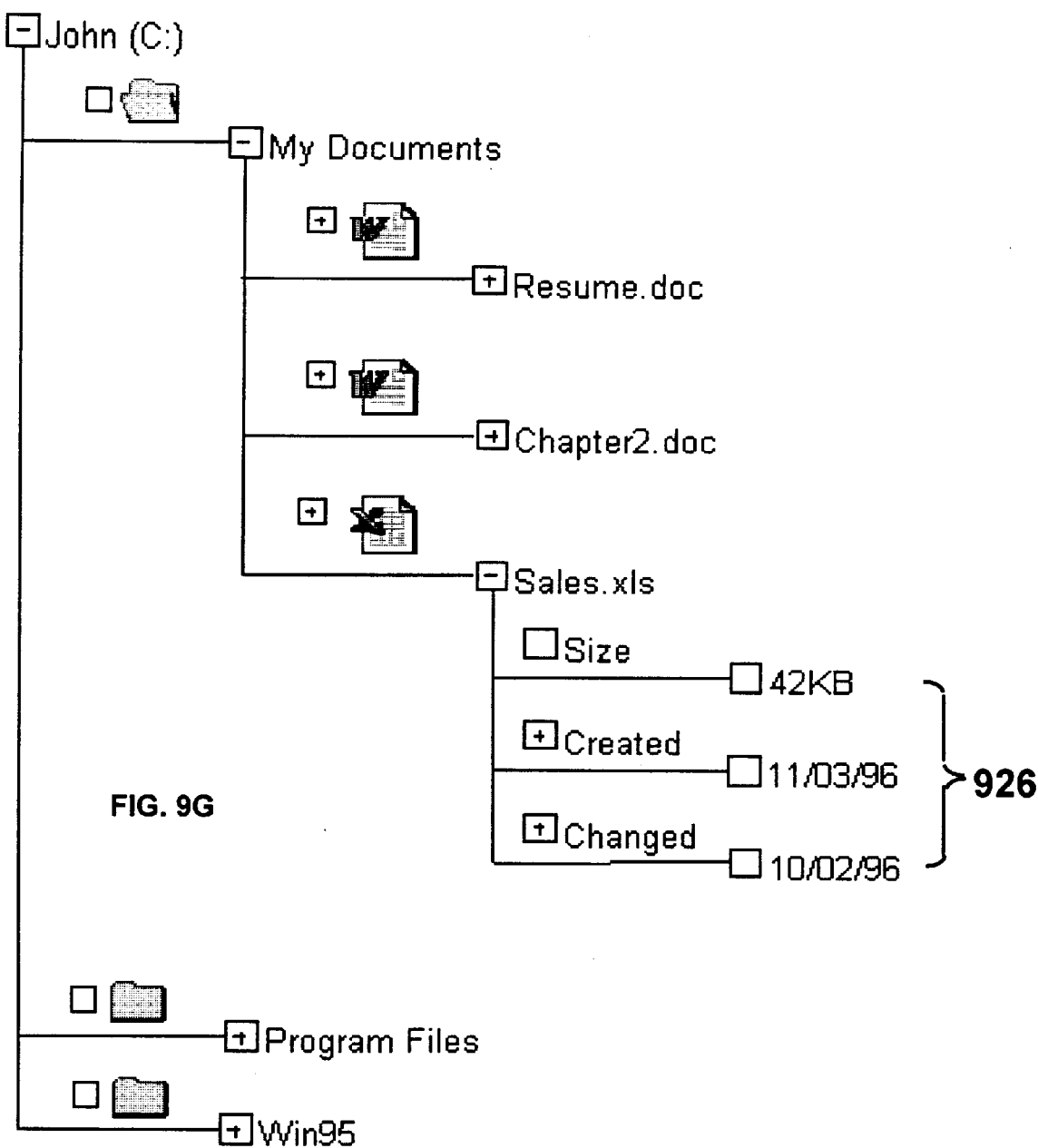
Figure 9H:
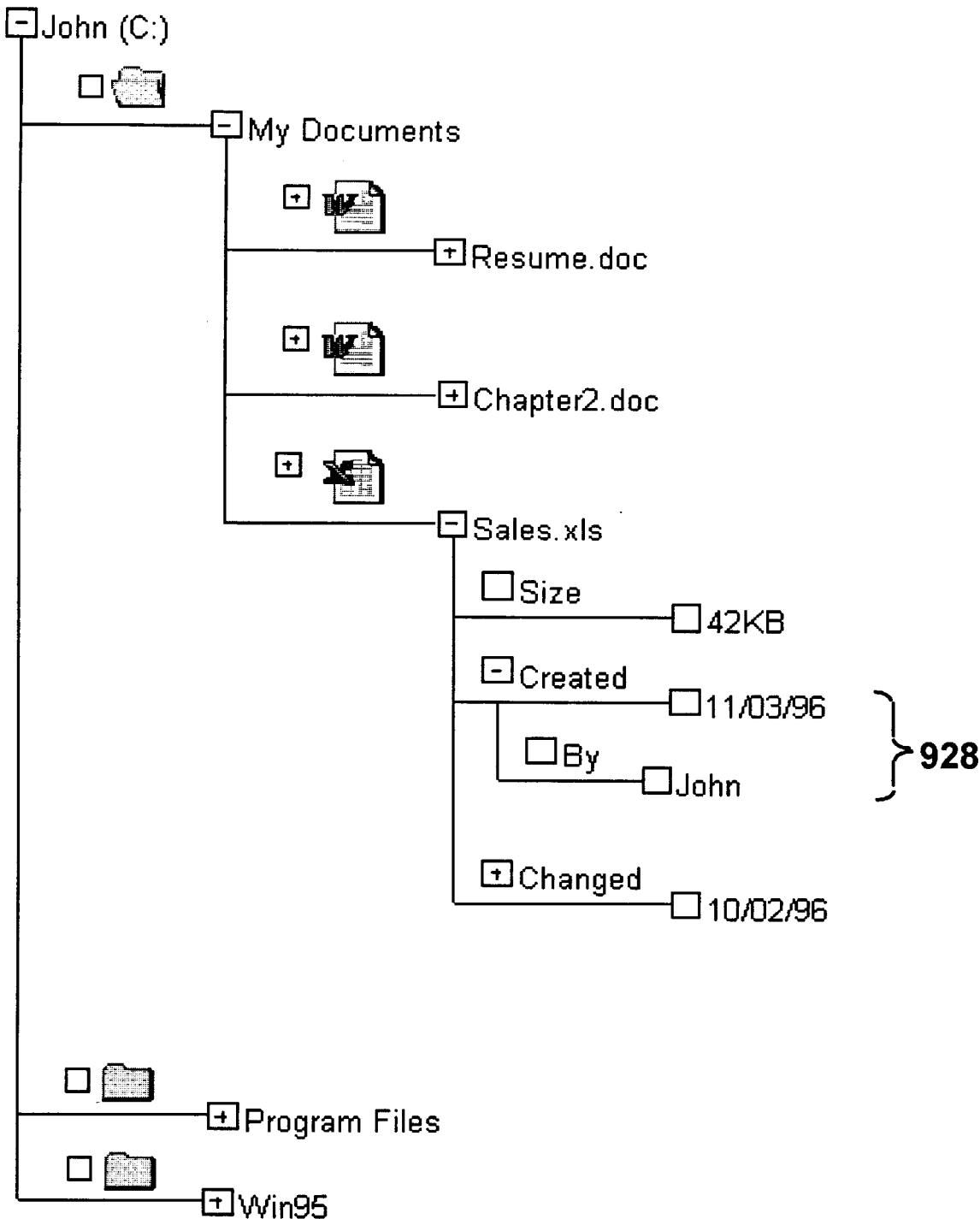

FIGS. 9E–9H shows a more detailed view of hard drive 902. FIG. 9E again shows the separation of folder icons 908 from folder names 910. In FIG. 9F, a user may double click on icon 922 to run the Excel spreadsheet application with the "Sales.xis" document, or click on button 924 to find out further information about the document before running Excel. FIG. 9G shows a view in which further information about the "Sales.xis" document is provided at 926, and FIG. 9H shows an even further level of detail at 928. Similar to the Internet Manager application, the Resource Manager application may be incorporated directly into a computer's operating system or embodied in separate application software.

Figure 10A:
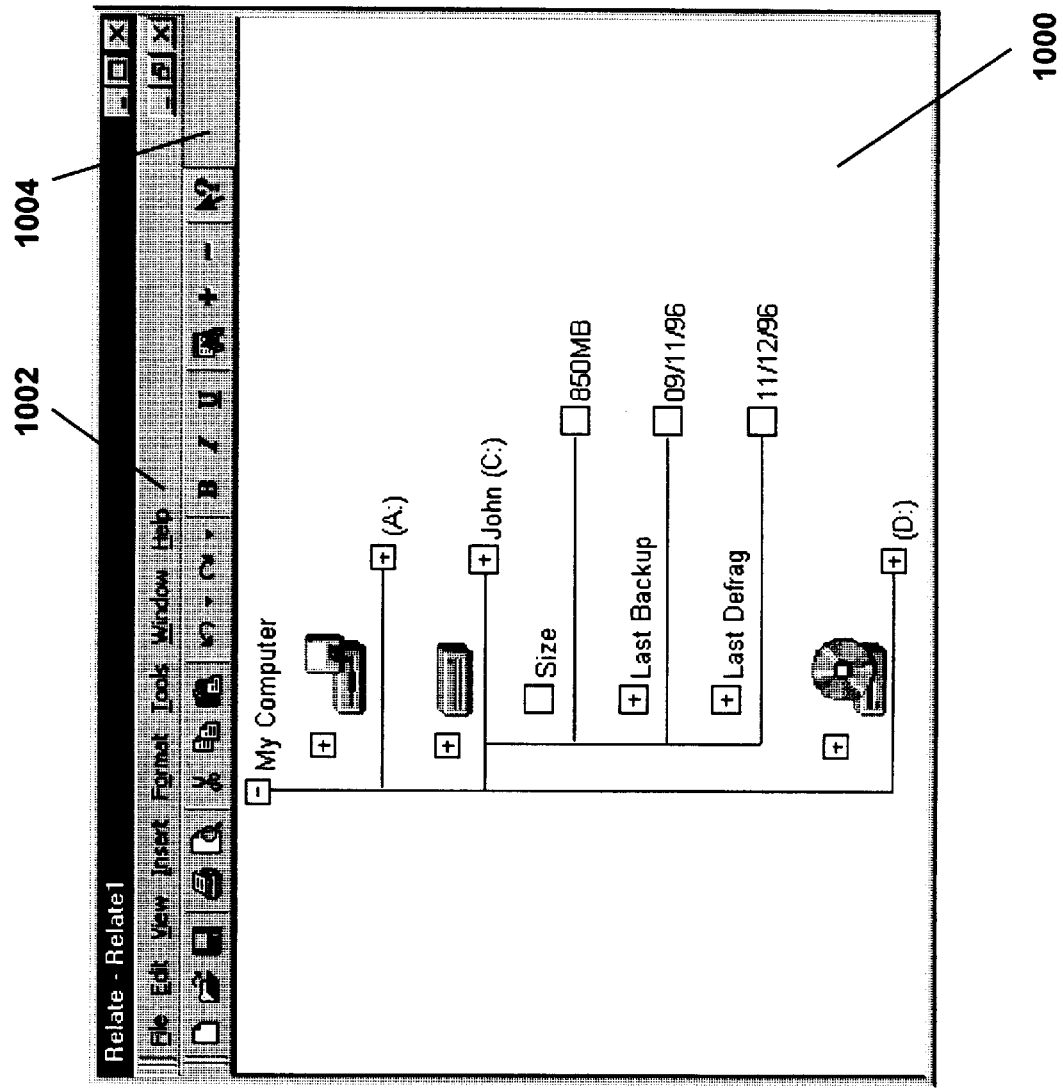
FIGS 10A–10B show detailed screen displays for the user interface.
Figure 10B:
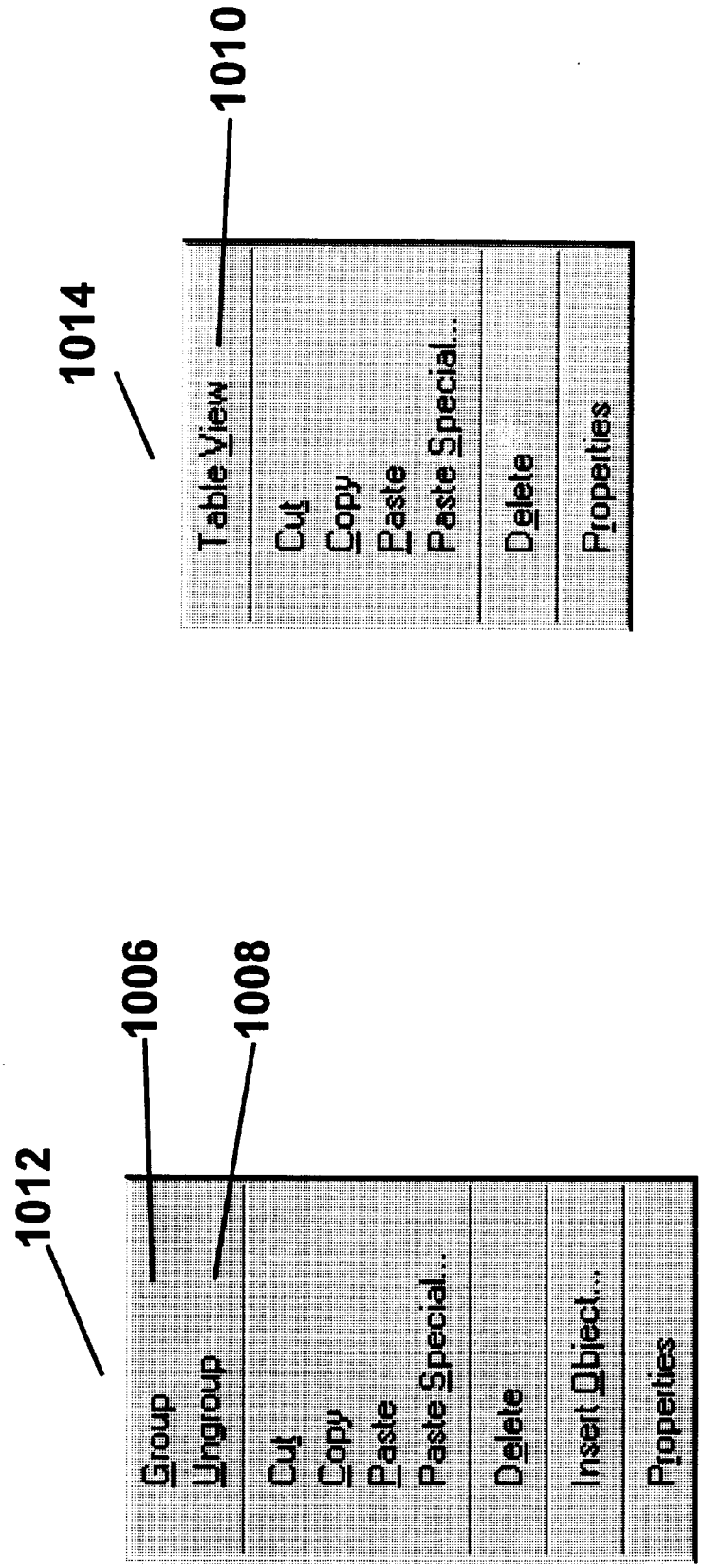

FIGS 10A–10B show detailed screen displays for one embodiment of the user interface. FIG. 10A shows a possible screen display for use with Microsoft's operating systems, and includes window 1000, menu bar 1002, and tool bar 1004. From left to right, the icons in tool bar 1004 relate to the standard icons used for new, open, save, print, preview, cut, copy, paste, undo, undo multiple, redo, redo multiple, bold, italic, underline, search, collapse, expand, and help. FIG. 10B shows possible shortcut menus for use with Microsoft's operating systems. Shortcut menu 1012 may be activated, for example, when the user clicks the right mouse button over an arc. This shortcut menu allows, among other things, group 1006 and ungroup 1008 actions to be performed on the selected arc. Shortcut menu 1014 may be activated, for example, when the user clicks the right mouse button over a button. This shortcut menu allows, where appropriate, the table 1010 action to be performed on the selected item. Other screen displays and shortcut menus may be used.

In this way, the present invention provides computer software and a user interface for information management. The invention has been shown and described in terms of a general information manager, an Internet Manager, and a Resource Manager. A preferred embodiment has been shown, which uses a particular object-oriented programming language. However, those persons skilled in the art will recognize that other applications may be developed, other programming languages may be used, and other modifications may be made to the preferred embodiment without departing from the spirit of the invention as claimed below.

I claim:

1. A computer system for information management, comprising:

an input device for entering a semantic network, said semantic network comprising labeled parent nodes, arc nodes, and destination nodes, each of said arc nodes connecting a parent node and a destination node;

an output device for displaying said semantic network in a basic form and in a group form, wherein said basic form comprises said parent nodes, arc nodes, and destination nodes, and wherein said group form comprises group arc nodes and other group nodes, said group arc nodes comprising those arc nodes having identical labels and identical parents, and said other group nodes comprising said parent nodes, arc nodes, and destination nodes other than said group arc nodes and said arc nodes comprising said group arc nodes;

a processing unit for identifying said group arc nodes and said other group nodes and for creating a data structure representing said semantic network in said basic form and said group form;

a memory unit for storing said data structure.

2. The computer system of claim 1, wherein at least one parent node or destination node is an arc node.

3. The computer system of claim 1, wherein said semantic network comprises Internet data.

4. The computer system of claim 1, wherein said semantic network comprises computer resource data.

5. The computer system of claim 1, wherein a destination of at least one group arc node is selected from the group consisting of a list box, a chart, and a graph.

6. A method of managing information on a general-purpose computer system, comprising:

storing an executable information management program in a memory of said computer; and executing said executable information management program, comprising the steps of:

inputting a semantic network using an input device, said semantic network comprising labeled parent nodes, arc nodes and destination nodes, each of said arc nodes connecting a parent node and a destination node;

storing said semantic network in said memory of said computer in a basic form and in a group form, said basic form comprising said parent nodes, arc nodes and destination nodes, and said group form comprising group arc nodes and other group nodes, said group arc nodes comprising those arc nodes having identical labels and identical parents, and said other group nodes comprising said parent nodes, arc nodes and destination nodes other than said group arc nodes and said arc nodes comprising said group arc nodes; and displaying said semantic network stored in said memory on an output device, wherein said semantic network may be displayed in said basic form and in said group form.

7. The method of claim 6, wherein at least one parent node or destination node is an arc node.

8. The method of claim 6, wherein said semantic network comprises Internet data.

9. The method of claim 6, wherein said semantic network comprises computer resource data.

10. The method of claim 6, wherein a destination of at least one group arc node is selected from the group consisting of a list box, a chart, and a graph.

* * * * *